United States Patent
Wagner

(10) Patent No.: US 9,617,752 B2
(45) Date of Patent: Apr. 11, 2017

(54) TOWER CONSTRUCTION OF A WIND TURBINE AND METHOD FOR STABILIZING A TOWER CONSTRUCTION OF A WIND TURBINE

(71) Applicant: x-Tower Constructions GmbH, Munich (DE)

(72) Inventor: Philipp Wagner, Mellrichstadt (DE)

(73) Assignee: X-Tower Construction GmbH, Munich (DE)

( * ) Notice: Subject to any disclaimer, the term of this patent is extended or adjusted under 35 U.S.C. 154(b) by 0 days.

(21) Appl. No.: 14/424,470

(22) PCT Filed: Sep. 3, 2013

(86) PCT No.: PCT/EP2013/068207
§ 371 (c)(1),
(2) Date: Jun. 26, 2015

(87) PCT Pub. No.: WO2014/033332
PCT Pub. Date: Mar. 6, 2014

(65) Prior Publication Data
US 2015/0308139 A1    Oct. 29, 2015

(30) Foreign Application Priority Data

Sep. 3, 2012  (DE) .................. 10 2012 017 301
Sep. 3, 2012  (DE) .................. 10 2012 017 302

(51) Int. Cl.
| | | |
|---|---|---|
| E04H 12/20 | (2006.01) | |
| E04H 12/12 | (2006.01) | |
| E02D 27/42 | (2006.01) | |
| E04C 5/08 | (2006.01) | |
| E04H 12/16 | (2006.01) | |
| F03D 13/20 | (2016.01) | |

(52) U.S. Cl.
CPC ........... *E04H 12/20* (2013.01); *E02D 27/425* (2013.01); *E04C 5/08* (2013.01); *E04H 12/12* (2013.01);
(Continued)

(58) Field of Classification Search
CPC ......... E04H 12/20; E04H 12/12; E04H 12/16; F03D 13/20; E04C 5/08; E02D 27/425; E04B 2103/02; Y02E 10/28
See application file for complete search history.

(56) References Cited

U.S. PATENT DOCUMENTS 2,730,207  A  *  1/1956  Hall .................. E04H 12/34
                                                        137/625.24
2,975,601  A  *  3/1961  Thorson .............. E21B 15/02
                                                        166/358
(Continued)

FOREIGN PATENT DOCUMENTS

DE    102011107804 A1  *  1/2013  ............. E04H 12/12
EP       2339094         6/2011

OTHER PUBLICATIONS

International search report dated Nov. 22, 2013.

*Primary Examiner* — Jeanette E Chapman
(74) *Attorney, Agent, or Firm* — Calson, Gaskey & Olds, PC

(57) ABSTRACT

A tower structure for a wind power plant permits very high hub heights in a cooperation of internal prestress, guying, and a torsionally rigid tower shaft. The tower structure has a tower shaft, a foundation and a transition piece in a he region of an upper end of the tower shaft. Guy elements are inclined towards a longitudinal axis of the tower shaft, and extend radially outside an outer skin of the tower shaft. Tension members are radially inside the outer skin to prestress the tower shaft vertically at least in sections. The tower shaft is made of prestressed concrete in a region between the transition piece and the foundation. To control resonance behavior, prestressing and guy elements are acted upon with a variable tensile stress which varies and influences natural frequencies of the tower structure such that no interferences occur between excitation frequencies and the (Continued)

natural frequencies, and such that an aerodynamic absorption is also possible.

15 Claims, 28 Drawing Sheets

(52) U.S. Cl.
CPC .......... *E04H 12/16* (2013.01); *F03D 13/20* (2016.05); *E04B 2103/02* (2013.01); *Y02E 10/728* (2013.01)

(56) References Cited

U.S. PATENT DOCUMENTS

| | | | | |
|---|---|---|---|---|
| 3,219,224 | A * | 11/1965 | Anderson | E04H 12/30 220/567 |
| 4,266,911 | A | 5/1981 | Helm et al. | |
| 5,062,765 | A * | 11/1991 | McConachy | F03D 1/00 403/58 |
| 5,146,096 | A * | 9/1992 | McConachy | F03D 1/00 290/44 |
| 7,471,010 | B1 * | 12/2008 | Fingersh | F03D 9/17 290/4 R |
| 2003/0015877 | A1 * | 1/2003 | Schlemenat | F03D 1/025 290/55 |
| 2008/0313972 | A1 | 12/2008 | Grob et al. | |
| 2009/0307998 | A1 * | 12/2009 | Zavitz | E04H 12/12 52/152 |
| 2010/0123112 | A1 * | 5/2010 | Kahtani | E01F 7/02 256/12.5 |
| 2012/0234954 | A1 * | 9/2012 | Pereira | B65H 59/40 242/148 |
| 2012/0311948 | A1 | 12/2012 | Hangel | |

\* cited by examiner

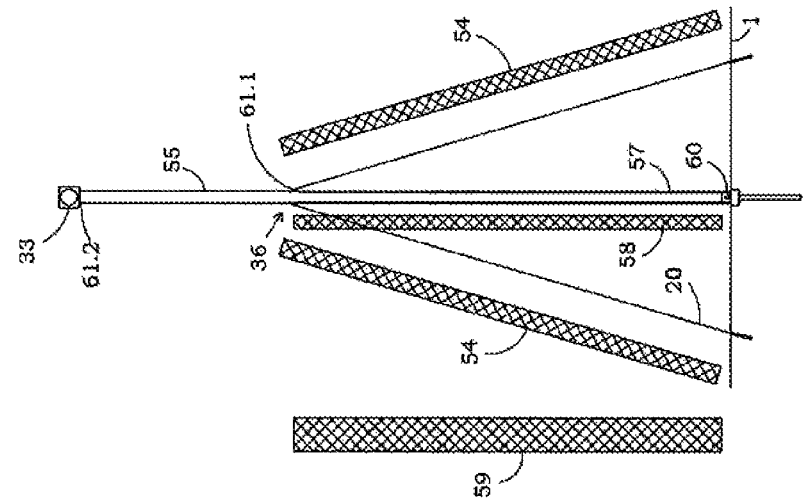
Fig. 7b
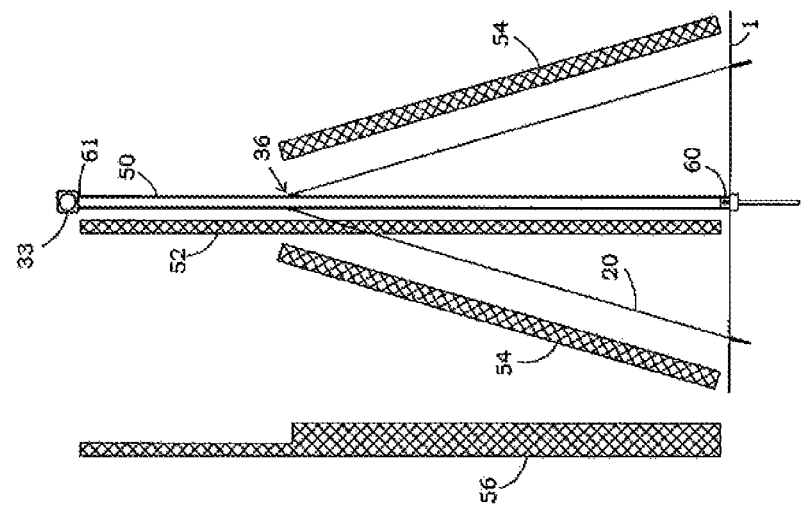
Fig. 7a
Fig. 7

Fig. 8.1
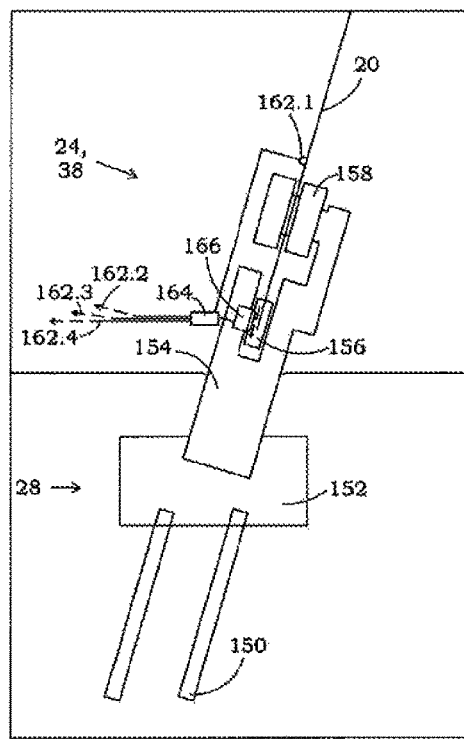
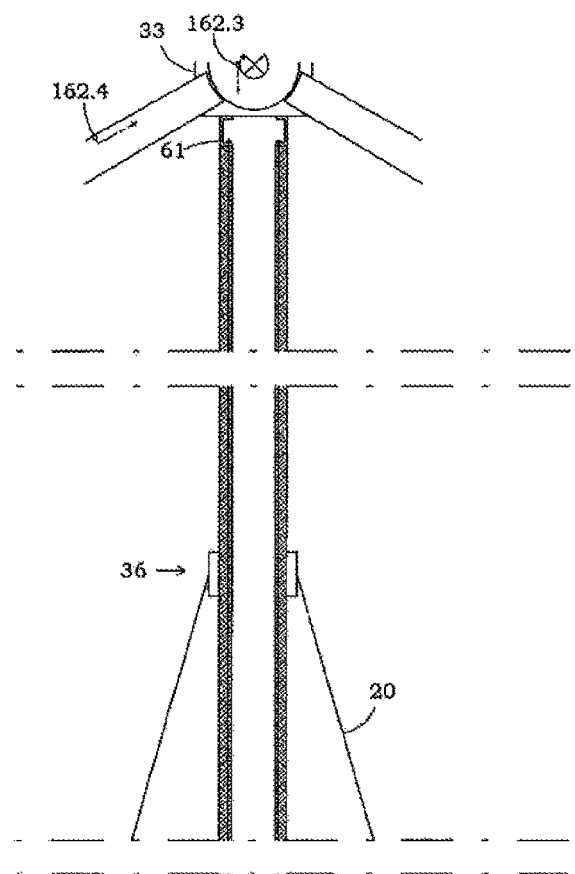
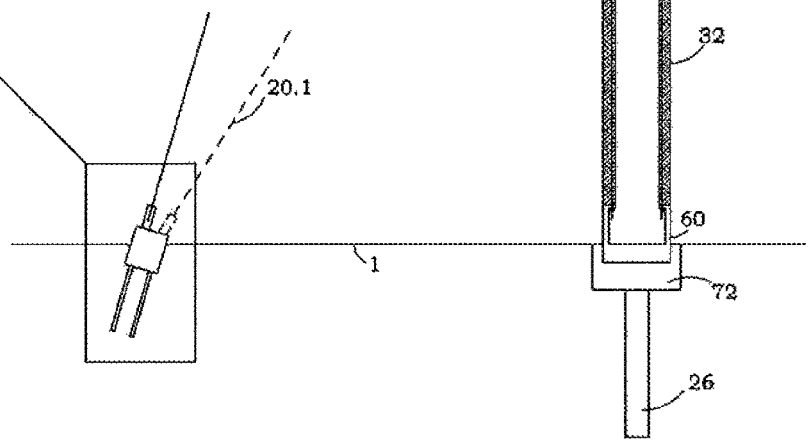

Fig. 8.2
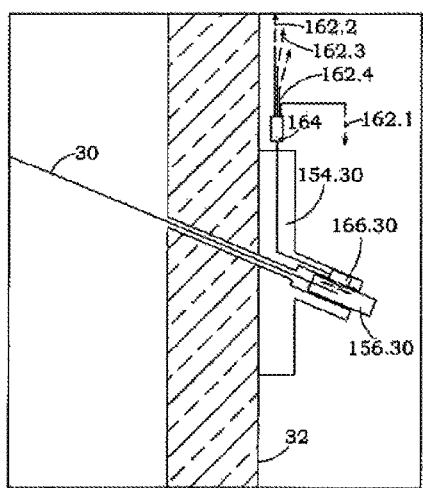
8.2.B
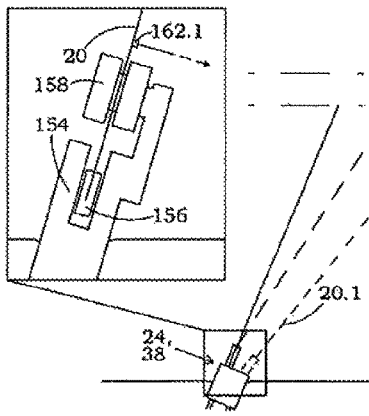
8.2.A
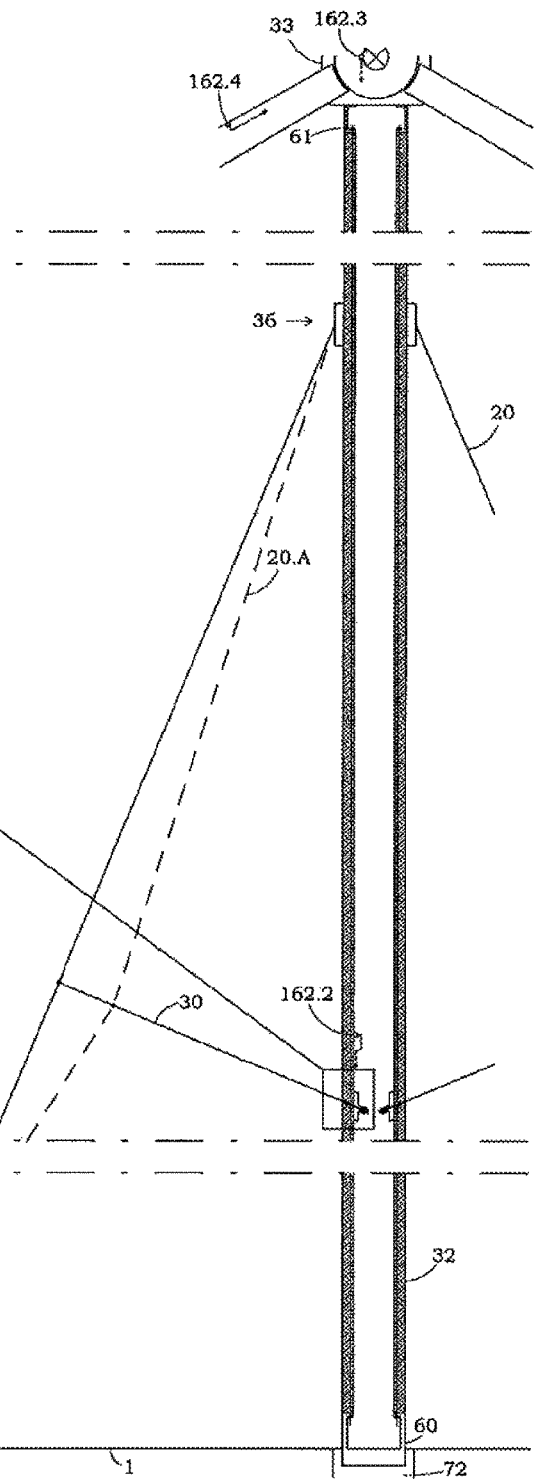

Fig. 8.3
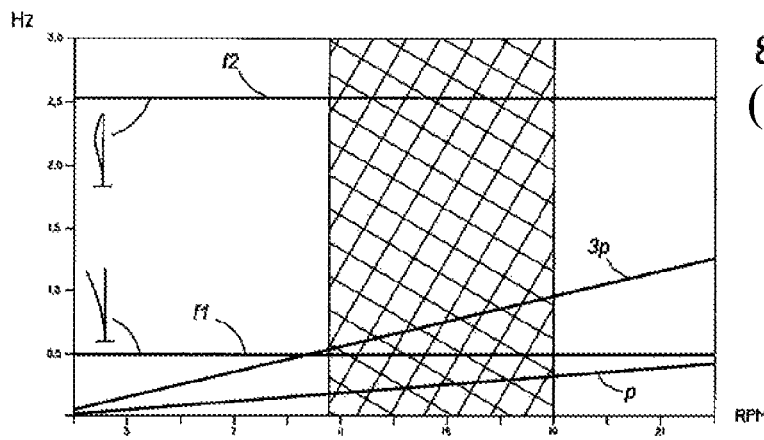
8.3.1
(Prior Art)
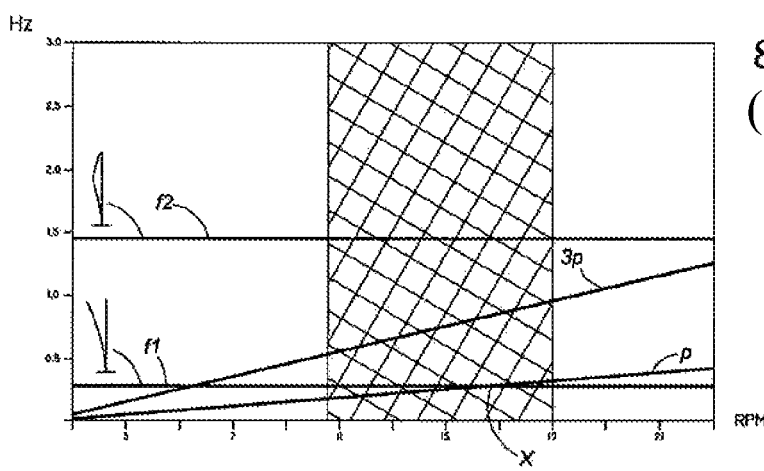
8.3.2
(Prior Art)
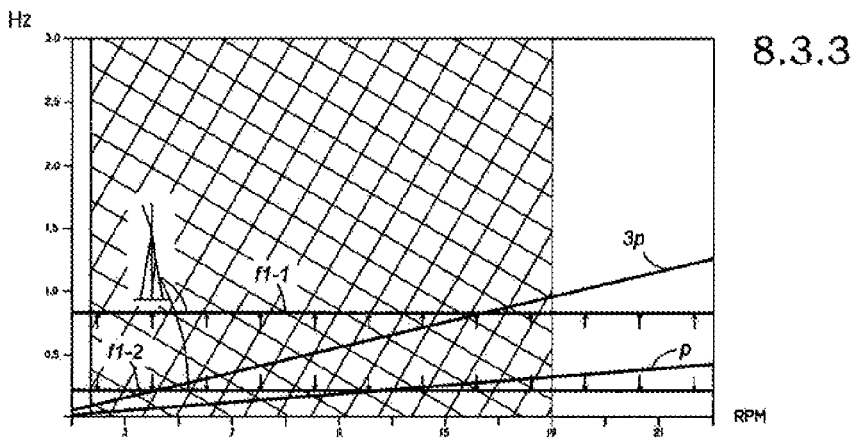
8.3.3

Fig. 11
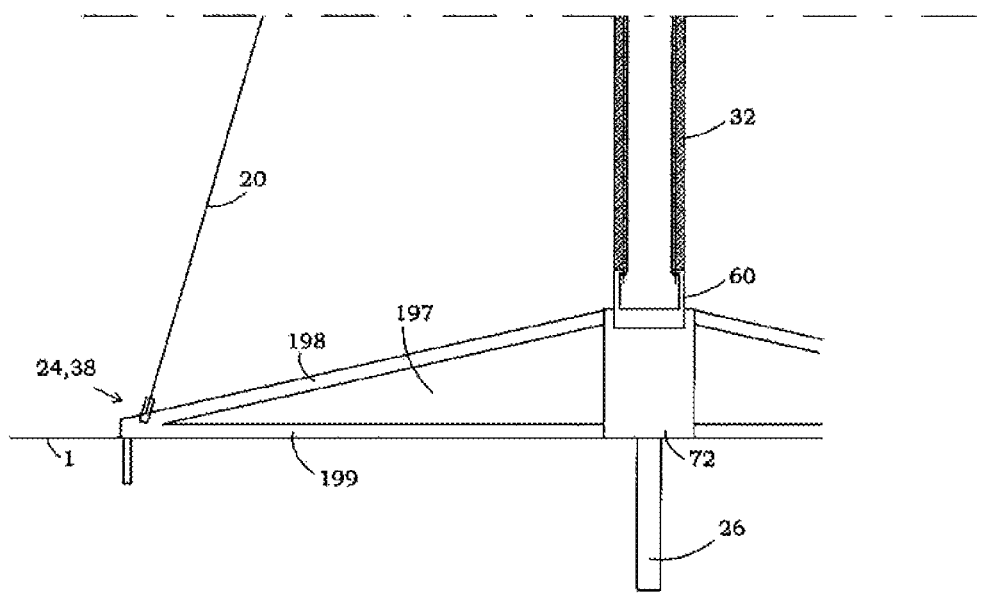
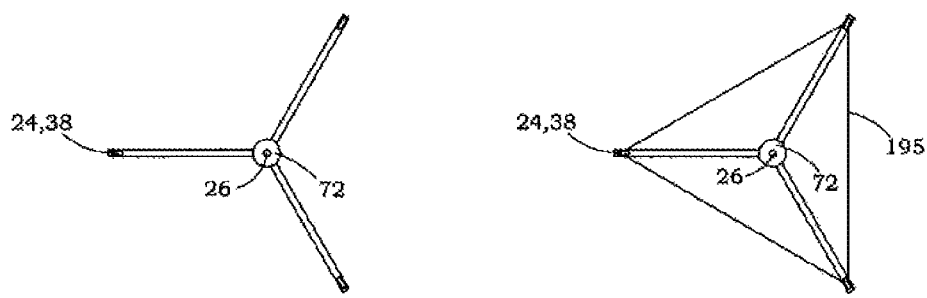
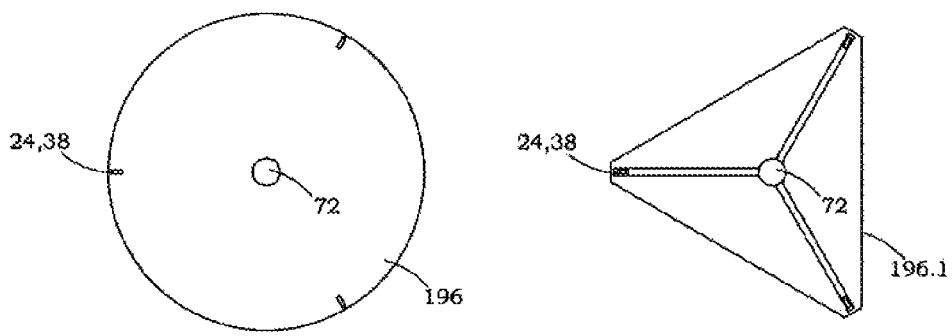

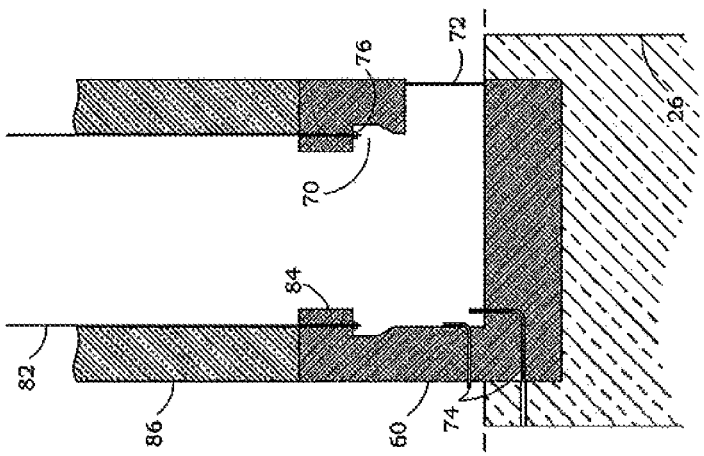
Fig. 18
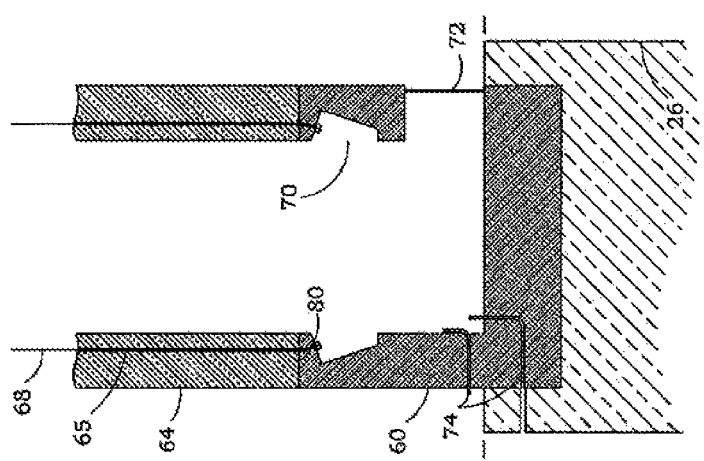
Fig. 18a
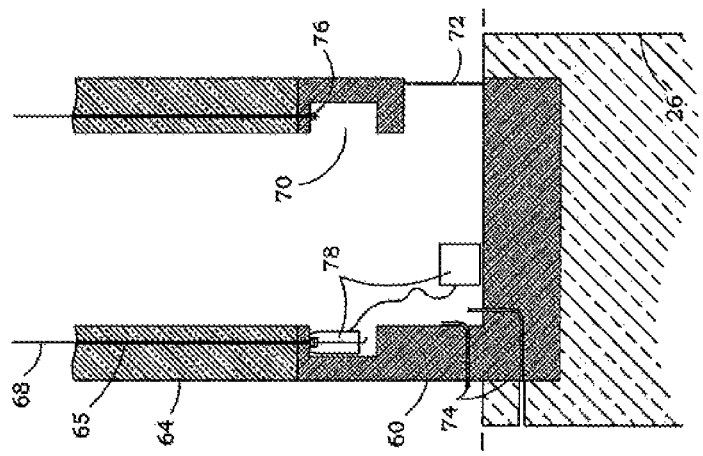
Fig. 18b
Fig. 18c

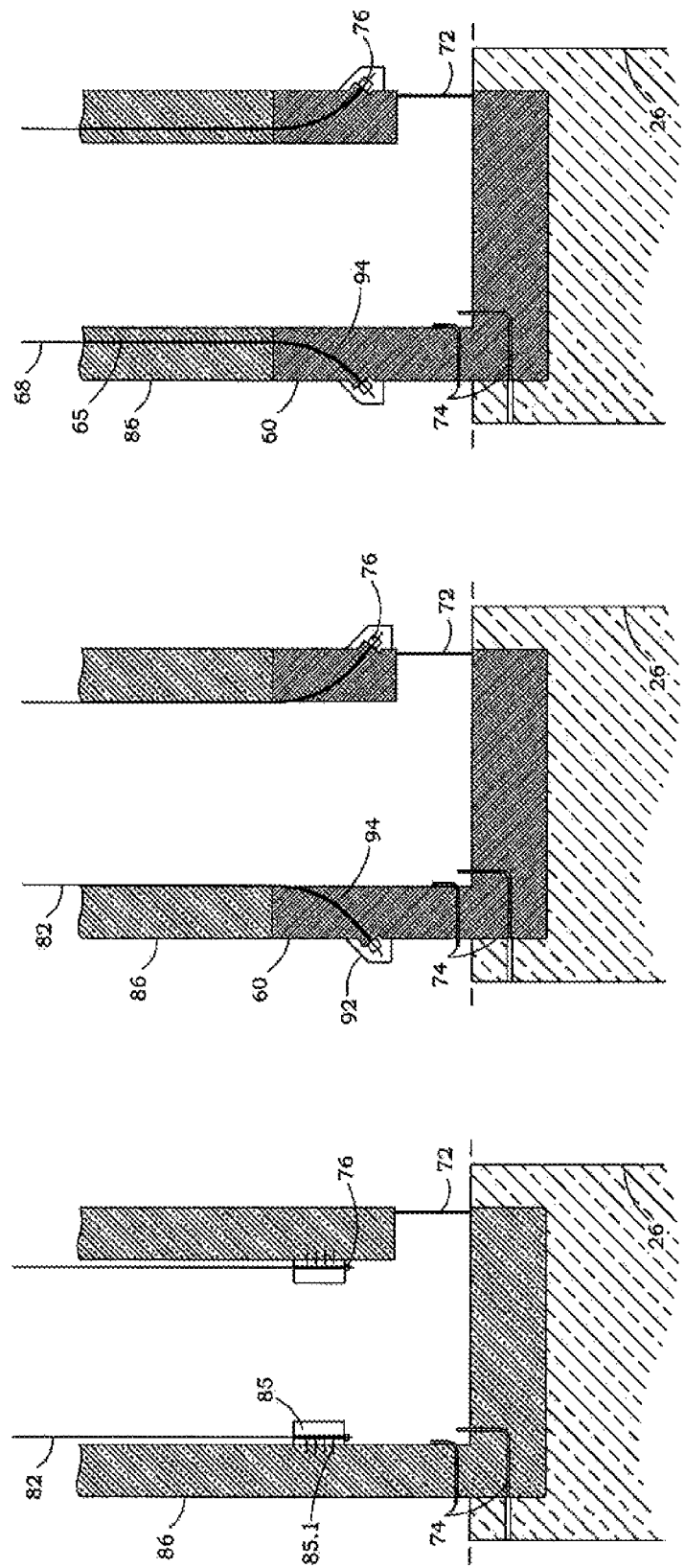

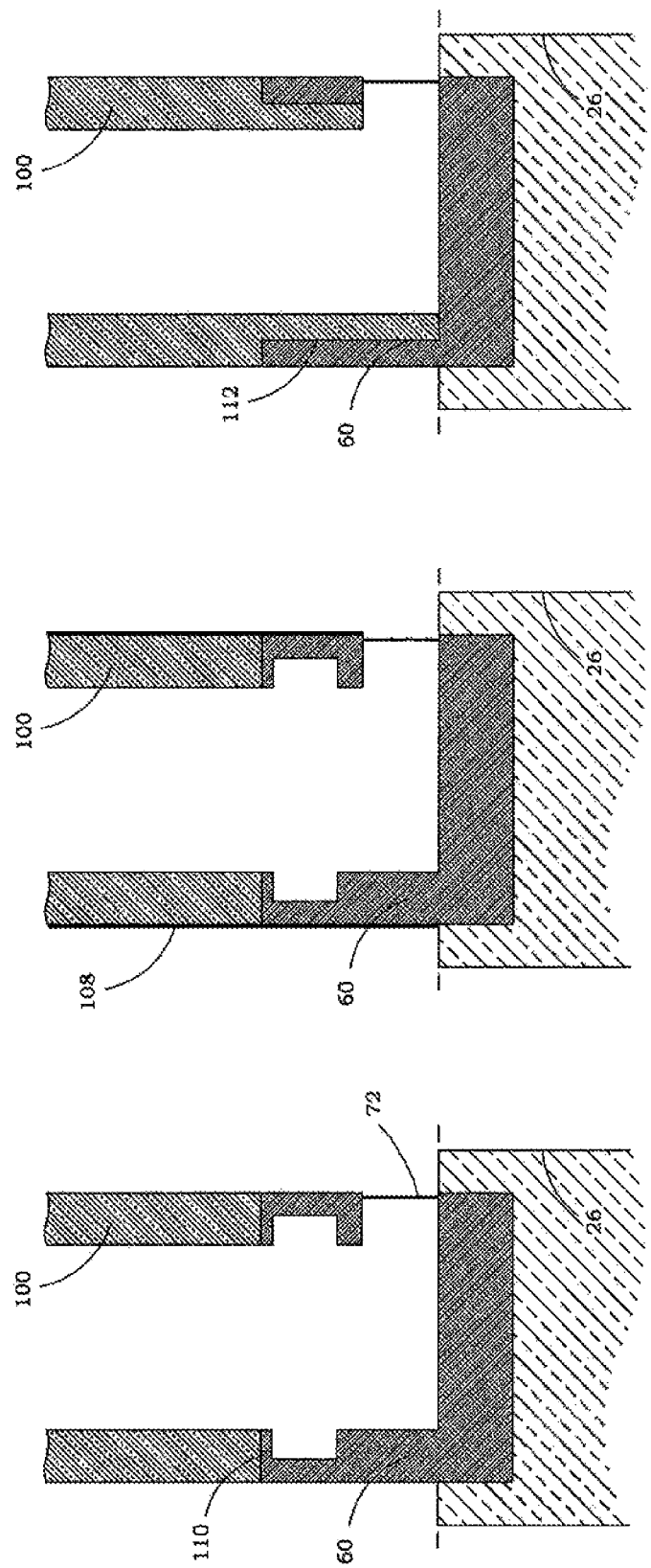

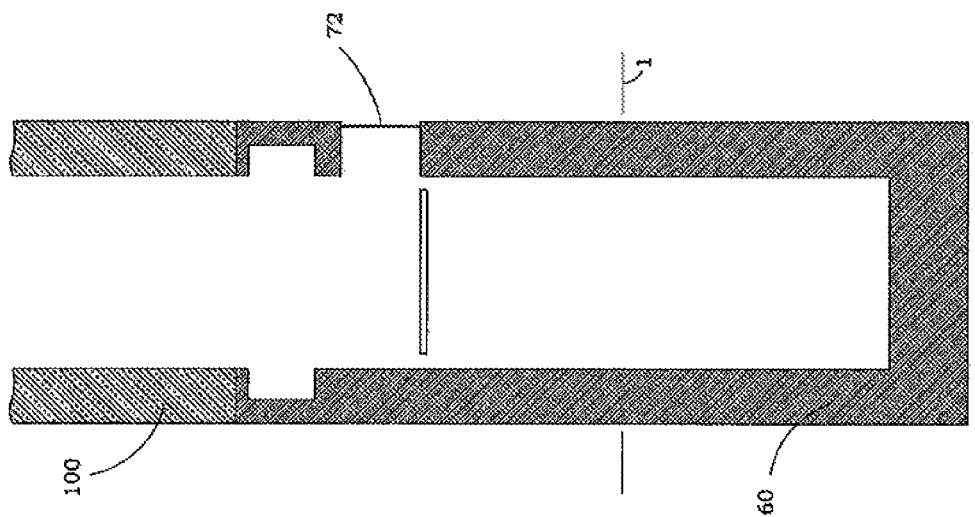
Fig. 21c
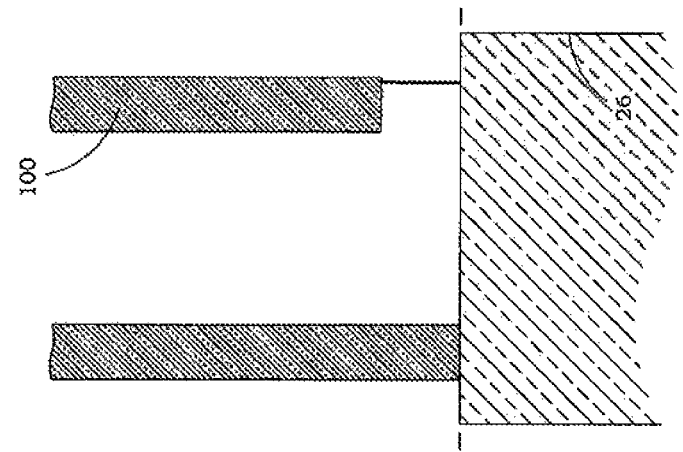
Fig. 21b
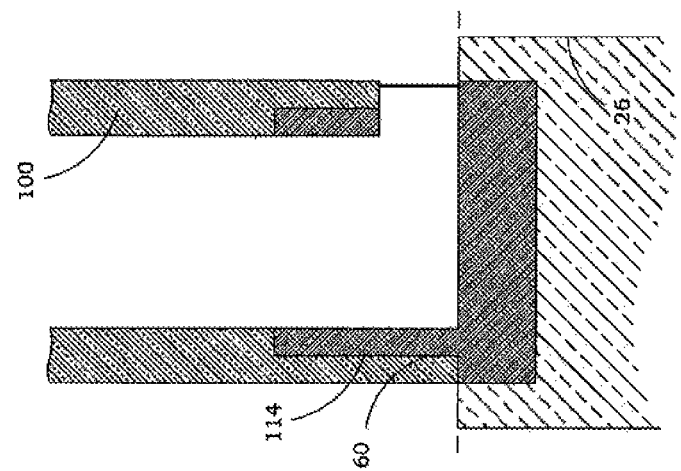
Fig. 21a
Fig. 21

Fig. 22
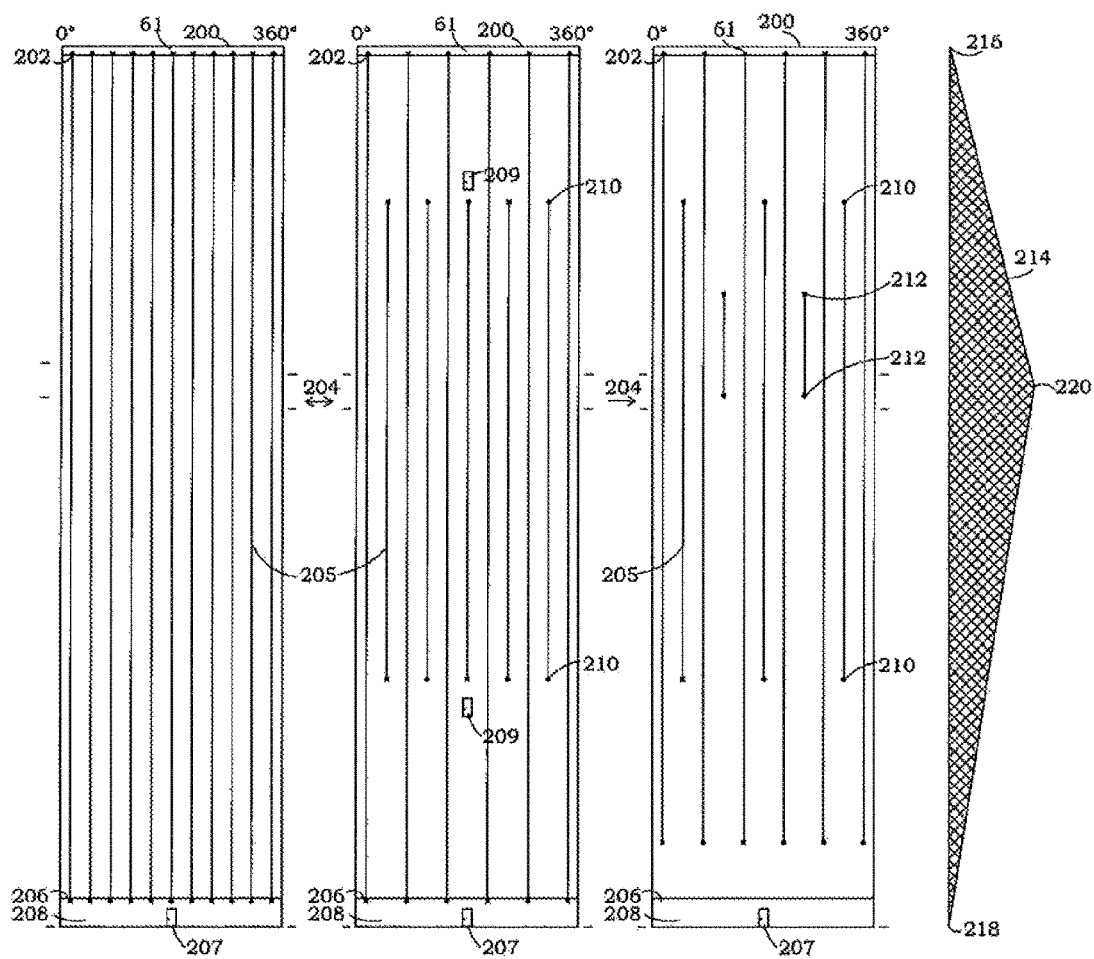
Fig. 22a        Fig. 22b        Fig. 22c
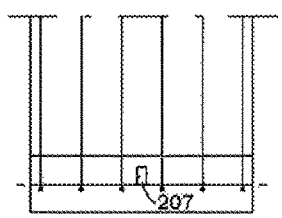
Fig. 22d

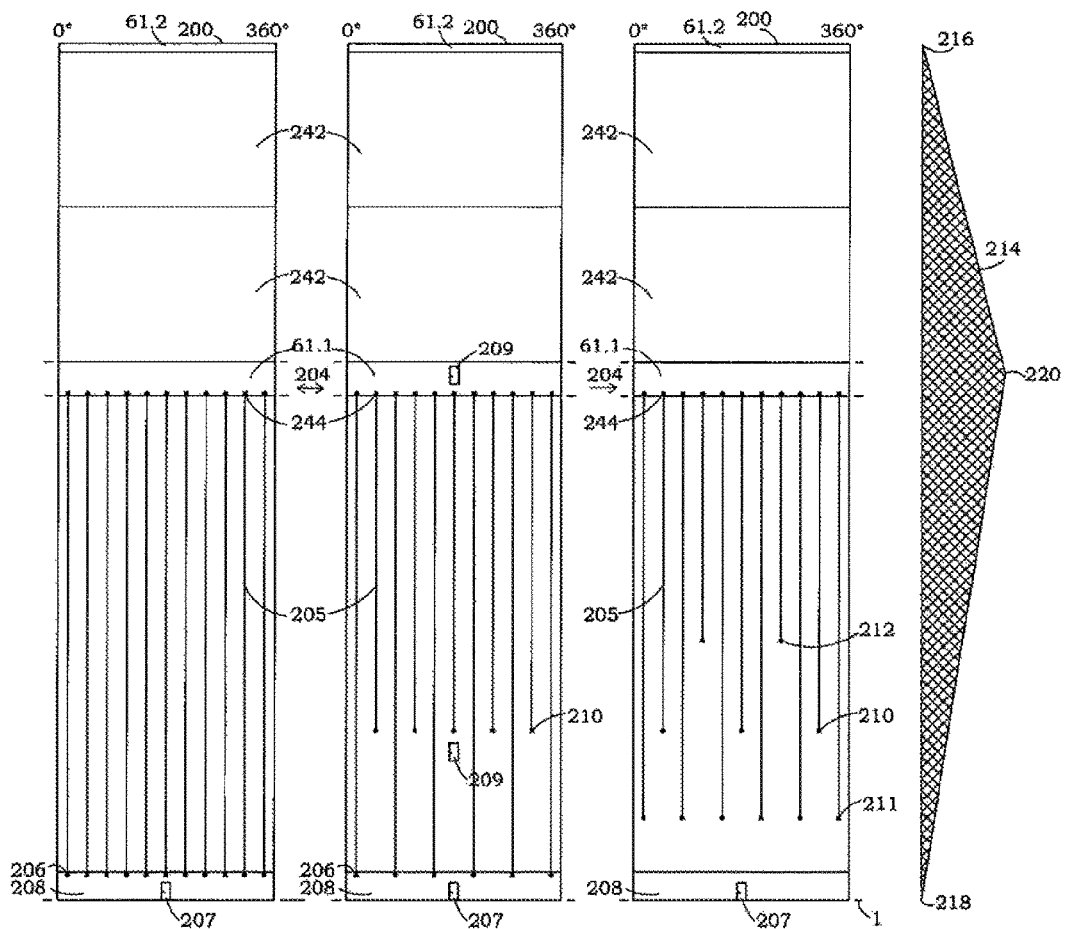

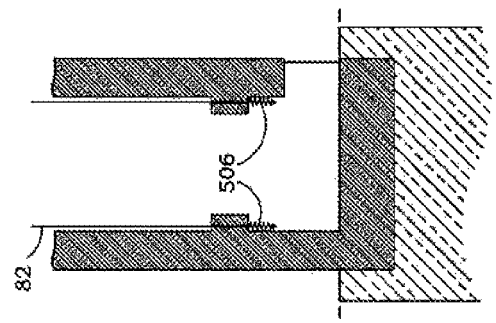
Fig. 28
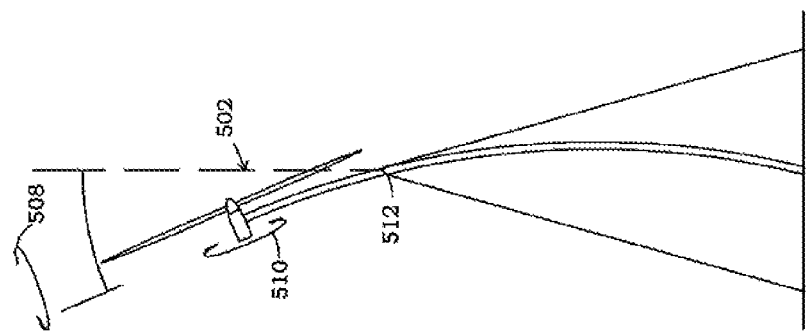
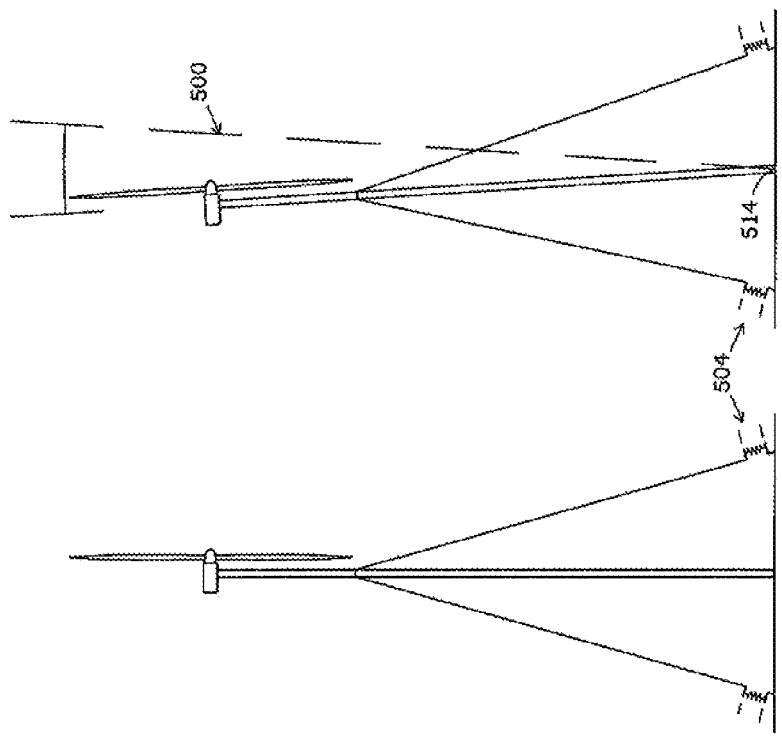
Fig. 28d
Fig. 28c
Fig. 28b
Fig. 28a

TOWER CONSTRUCTION OF A WIND TURBINE AND METHOD FOR STABILIZING A TOWER CONSTRUCTION OF A WIND TURBINE

RELATED APPLICATION

This application is the U.S. national phase of PCT/EP2013/068207, filed Sep. 3, 2013, which claims priority to DE 10 2012 017 302.4, filed Sep. 3, 2012, and DE 10 2012 017 301.6, filed Sep. 3, 2012.

TECHNICAL FIELD

The invention relates to building methods for towers of wind power plants and to a method of stabilizing a tower structure of a wind power plant.

BACKGROUND

The wind power plants (WPP) having wind generators, to which the building methods according to the invention refer, comprise a concrete tower and heavy, partly widely projecting large components mounted on the spire. These large components, if any, include a nacelle, an electric generator, a rotor having at least one rotor blade, and, if any, a transmission for the rotor as well as in the case of hybrid towers, additional tubular steel segments which are placed onto the concrete tower and support the wind generator(s).

Wind power plants of different sizes, powers and of different types are increasingly used to generate electric energy from the kinetic energy of the wind. The efficiency of such a wind power plant depends, among other things, on the fact that the wind is present and distributed as long and as uniformly as possible throughout the year.

It is known that the yields which can be produced by wind power plants from the wind supply distributed over the year are the larger the higher the wind power plants can be constructed, as in higher heights the wind on average blows faster and in a more laminar fashion. This applies in particular to inland regions or to hilly or mountainous regions.

In the recent years, the trend is moving towards ever increasing plant units due to economic considerations, with the most widespread type of wind power plants, the type with a multi-blade rotor having a horizontal axis positioned on a tower. This type still has the largest market potential. One problem of this type of wind power plant consists in that the upscale of large components of the wind generator simultaneously necessitates an increasingly higher and stabler tower. In the meantime, 30 to 45% of the total building costs are allotted to these tower structures and their foundations, which makes the economic efficiency of the tower constructions of such large wind power plants ("multimegawatt plants") to a decisive factor. Accordingly, this also applies to WPPs having rotors with a vertical axis, the size of which is also constantly increasing.

In principle, WPPs which are increasingly high and increasingly powerful are practical, since even in the conventional building principle of the self-supporting vertical cantilever arm fixed at one end, the materials consumed for the tower structure rise merely to the second power as the performance increases. The energy yield leads to an increase of the yield to the third power due to the performance equation of the wind. In the past, this circumstance has led to a considerable increase in performance of WPPs, which is still incessant.

This trend has also been reflected in the development of increasingly high and strong towers. However, in case of rotors having a horizontal axis, this trend now meets a limit at which the additional yield of the machine considerably restricts the overall economic efficiency due the significantly increasing tower and foundation costs. In particular the operators of wind power plants on sites with a low wind availability, for example on inland sites, depend on very high hub heights to economically generate yields. Thus they depend on very high and simultaneously very economical tower structures.

In recent years, different tower types have been tested and developed to increase the hub height and to shift the rotor to higher atmospheric layers with improved wind availability. Here, in particular the concrete tower, the hybrid tower comprising a concrete shaft and a fitted steel mast on which the wind generator is placed, as well as high lattice mast constructions are to be mentioned.

Each of these tower types has its own advantages and drawbacks, the one or other type of tower being then preferred depending on the case of application.

A drawback in all building methods for powerful wind generators offered on the market is the high increase in material consumption for static and dynamic reasons, which is caused by the building principle as such: the higher the freestanding towers are configured, the more the constructive effect becomes important. The mass consumption increases exponentially with an increasing height like mentioned above. On the one hand this effect results from a consideration of the lever principle of statics, according to which the product of force and lever arm causes a moment in the component which necessitates an appropriate dimensioning. On the other hand it results from the requirements of dynamics, according to which components have to be provided with appropriate reserves in the cross-section as a result of fatigue stress over the period of use. In towers of wind power plants, this effect is increasingly noticeable in particular as from heights of approximately 120 meters.

Furthermore, as from approximately 140 meters, additional inherent difficulties immanent in material and construction occur in all tower building methods. They are also to be mentioned here to illustrate on the basis of which problem the invention has been developed:

Pure tubular steel towers having a solid web cross-section are particularly susceptible to oscillations as from heights of 120 meters due to their softness. Absorbers and damping elements are necessary to reduce the oscillations of the tower. In the case of pure steel constructions, for example, at a hub height of 140 meters, up to two thirds of the required steel amount are furthermore necessary to respond to the dynamic stresses and the problems of fatigue and the oscillation excitation to be avoided. Moreover, due to the mentioned softness, specific rotor speeds cannot be used since they would incite oscillations of the tower. Due to this fact, at specific wind velocities, the rotor has to rotate more slowly than the wind would permit. This results in a loss of performance outside the speed optimum for the given wind profile.

Concrete towers and hybrid towers require, as the height increases, considerable masses as a result of the required tower shaft spread at the lower end of the tower. They require considerable prestressing forces necessary to configure the tower which constitutes a lever arm. Here, cast-in-situ towers and prefabricated towers bonded by horizontal joints or having unstuck horizontal dry joints function with extreme prestress forces. This means that the prestress applied via the tension members is adjusted to provide a sufficient counterforce to the tensile forces occurring in the component as a result of the lever arm. The prestress force is dimensioned in order to maintain the concrete shaft optionally constantly prestressed up to the extent that joints would not open, or such that in case of cast-in-situ towers, a transition from state I to state II of the concrete is permitted only under extreme load. In case of cast-in-situ constructions or stick prefabricated tower-parts the transition from state I to state II leads to additional shifts of natural frequency of the tower.

Though lattice masts first avoid the considerably rising mass increase of the already mentioned building methods as the height increases is implemented by resolving the tower shaft into individual bars. In lattice towers the forces occurring are transmitted by a lattice structure of composed bars between the nacelle and the ground area. Lattice masts however have a particularly wide spread at their lower end due to their building principle. This spread is often felt as unpleasant. In consequent lattice masts have never become widely accepted. Furthermore, they are classified as no ideal tower building method by the maintenance staff of the WPP because there is no weatherproof climbing means to the generator. This is making their work hard during all the years of operation. High lattice mast towers are moreover considered as prone to torsion.

The drawback in all cantilevers fixed at one end are all the natural frequencies of the freestanding tower structure resulting from the susceptibility to oscillation, which are illustrated in Campbell diagrams and which lead to the described power losses during operation of the plant. Specific speed ranges have to be avoided due to their natural frequency, or they require a modified (increased) tower geometry for the desired nominal operation which does not constitute the economical optimum with respect to the tower design. Today, most towers are configured as so-called "hard/soft" constructions in which the permitted speed range of the rotor begins in a Campbell diagram above the intersection between the first natural frequency of the tower structure and the excitation by the rotor $3p$ having usually 3 blades. The speed range ends before the excitation p is reached, which is for example caused by unbalances of the rotor. A very high material consumption to reach a sufficient rigidity for the tower construction is a "hard/hard" design of the tower construction in which the lower speeds needs to be avoided. Lower speeds, however, are desirable for sites with light winds. Soft/soft constructions as a third design option are rejected by the experts as being insufficiently determined.

At the beginning of the development of commercial wind power industry, a guyed tower tube made of steel has been tested at the approximately 100 meters high tower of the large wind plant Growian and at the smaller experimental plant Monopteros in Wilhelmshaven. The configuration constituted a certain improvement of the static system but it was not further pursued due to multiple technical problems of both plants. At that time, the guying was guided up to below the nacelle, and the rotor blades were provided with an appropriate inclination to the front. This is no longer acceptable with respect to the rotor blade geometry according to today's building principles which are to be as economical as possible. Today, in an extreme load-case, the blade tips run very close to the tower.

Today, guyed tower tubes are merely offered and used in the field of small wind power plants and for plants of middle size. They have a low hub height of less than 100 meters. They usually consist of a metallic tube which is guyed by ropes below the rotor. The purpose of this guying is merely restricted to the removal of the forces acting horizontally on the tower shaft, in particular as a result of the occurring rotor thrust that needs to be transferred into the subsoil. In this case of application, this building method is economical due to the highly reduced application of moment at the base point of the shaft construction and the unnecessary spreading of the shaft tube at the base of the tower.

One characteristic of the guying point at the tower shaft however is the laterally displaceable and flexible torsion spring. This makes the tower shafts made of steel torsionally very weak, in particular from an overall height of 150 meters, as far as they are also configured very slim. The drawback of the torsional weakness becomes important in combination with the now usual blade lengths of more than 60 meters for the mounted wind generators. Unevenly flowing wind at a vertical wind shear (more wind on the left than on the right), in case of turbulences or wind shadow effects in wind farms or of laterally rotating winds with an inclined flow generate a lever force. E.g. the left side of the rotor receives more thrust than the right side. In case of rotor diameters in particular of more than 120 meters the lever force becomes considerable. This lever force is received by the rotating blades is transmitted by the nacelle as torsional force into the tower shaft. These torsional forces, in addition to the lever forces acting on the tower shaft as dynamic stresses, play an increasingly important role the more the component size increases. The invention does not prefer the guying of pure steel tower shafts for the reason that the bending natural frequency and the torsional natural frequency of the tower and the excitation frequency of the large components of the wind generator, are too close to each other. Despite the required and desired slenderness of the tower construction, a low level of oscillation is a core criterion for a modern WPP with respect to its performance, since all components connected to the tower must ensure their full operational safety also in the worst load-case. In particular it must not cause a collision between the blade and the tower even in case of maximum unfavorable deflection of several components. Consequently, in reverse, this also leads to decreasing power-yields by switching-offs or suboptimal operating states. With regard to the invention explained further below, today load limits and excitation frequencies or similar of the rotor-blades and of the tower restrict the maximum possible wind-yield of the WPPs. Solid web steel constructions which tend to be softer in terms of bending and torsion and the material resistance are therefore not suitable for powerful wind generators having slender and long component dimensions.

The same applies to lattice masts. Slender guyed constructions such as transmitter masts or wind measuring masts, cannot support considerable weights and laterally widely projecting top charges.

Further, conventional fixed and guyed constructions of WPPs have no properties, e.g. actuators to alternate the prestressing of the guy members. No property influences the rigidity or the possible deflection of the tower structure to hold the generator in an improved manner with the rotating mass. Here, in particular the aerodynamic damping is to be mentioned. With aerodynamic damping in conventional building methods, the tower always responds in the same manner and does not permit any variably adjustable response behavior to the applied loads, in particular to the loads applied by the rotor thrust at the top flange. Conventional tower structures always respond in the same manner only because of the preset material properties, inertia and the overall configuration of the construction. This behavior results in a premature fatigue or in reverse to a higher material consumption both in the tower structure and in the rotor blades. In the end more material is used to obtain the desired properties with respect to elasticity, rigidity, oscillation behavior and the excitation frequencies of the components to be avoided, i.e. the aeroelastic interaction of rotor blades, turbine and tower structure as a unit.

In case rotors having a vertical axis are used, strong exciting periodic frequencies are disadvantageous due to the rotation of the rotor blades about the longitudinal axis. As a result of the usual rigidity of the rotor blades of this type of plant, the forces introduced into the tower are many times higher than comparable forces in multi-blade devices having a horizontal axis. The tower structure is much more loaded and tends to rolling or wobbling motions similar to precession as a result of the applied forces, which can no longer be economically compensated by a pure increase in material. The problem is further intensified as far as the rotor blades change their angle with respect to the rotation axis, as seen in a top view, at each rotation by means of a pitch system. Pitch systems are in particular used in large rotors having a vertical axis, which makes an adaptation of the tower and the response behavior thereof in particular to the applied periodic and also non-periodic loads of the vertical WPPs all the more necessary.

In conclusion the vertically configured conical cantilever fixed at one end with a maximum load introduction at the upper end reaches an economic limit from heights of 150 meters and more, and the guyed tower types in a steel building method developed so far give no economically relevant answer to the requirements of large multi-megawatt WPPs, in particular of such plants having large blade lengths in regions of light winds, which are very slender and prone to oscillations.

New advantageous tower building methods are now proposed for tower structures preferably as from a hub height of 140 meters against the prejudice of experts. Up to now, it was considered as non-economical, not logical and not in accordance with the trend of the WPP tower construction to propose guyed constructions instead of the freestanding towers for plants of the multi-megawatt class. In particular they were not considered in the context of concrete towers, because these are said to be too heavy. The trend towards increasingly large and high towers has up to now exclusively been organized by an upscale of existing building methods. According to their opinion, the physics of a rope static and the properties of concrete structures, taking the requirements on a highly dynamically loaded WPP tower into account, are said to lead to no economical or practical solution. The additionally oscillating large component of a guy element would make the calculation more difficult, would make the building process unnecessarily more complicated, and would require the maintenance of a further component over the lifetime. Furthermore, the interaction between the frequencies of guy elements and the other components of a WPP are not economically controllable. For these reasons, the existing building methods are maintained.

The invention shows that this is not correct.

SUMMARY

The invention avoids the problems of the self-supporting cantilever fixed at one end and extending upwards and avoids the problems of the torsional weakness of former slender guyed shaft cross-sections. Instead thereof, the invention ensures an optimal interaction between the prestress, the guying and the material properties, in particular the material resistances of the tower tube. It ensures a better response to the dynamic behavior of the overall systems and thus an improved and optimized aeroelasticity for the tower structure and the wind generator as a whole.

The solution to the problem is achieved by the building principle defined in the claims, which couples a guy system to a tower shaft such that the guying and the material resistance present in the tower shaft sum up and constitute an economically cheaper alternative in comparison with the mentioned conventional building methods. This counts in particular as from tower shaft slenderness ratios of more than 25, as from hub heights of in particular more than 140 meters, and generators of more than 2 megawatt installed capacity. The invention in particular relates to wind power plants in which the rotor blade length and the tower height are in a ratio of one to three or therebelow.

The features in full detail:

The prestressed concrete tower according to the invention for WPPs is preferably realized over its entire length with a constant shaft outer diameter or with constant shaft outer dimensions (in case of a polygon). The tension members, which apply the prestress between the lower end of the prestressed concrete element and the transition piece to the wind generator or to further tubular steel elements at the upper end of the prestressed concrete tower, optionally extend in the shaft wall or they are fixed to the wall or set therein. E.g. the tension members extend radially inside the outer skin of the tower shaft.

Part of the required prestress is guided into the tower foundation or into separate foundations which are arranged radially around the tower shaft. This part of the prestress is led through at least three radial guy elements, as seen in a top view, that extend diagonally away from the tower shaft, as seen in this view. The guy elements are attached to the tower shaft preferably below the rotor diameter and are attached at different heights of the tower shaft to further division points of the tower shaft in case of a multiple guying. The guy elements extend radially outside the tower shaft. In one example, the tower structure is configured with a tower shaft, a foundation and a transition piece in the region of the upper end of the tower shaft. Guy elements extend radially outside the tower shaft. The tower shaft is guyed at least in sections. Tension members are positioned radially inside the outer skin of the tower shaft. The tension members prestress the tower shaft vertically at least in sections. The tower shaft is made of concrete, in particular of prestressed concrete in the region between the transition piece and the foundation. Furthermore, the guy is not configured as a rigid system. Rather, it is configured to allow aerodynamic damping so that possible natural resonances can be suppressed.

A variable guy system permits to combine the guying and the necessary prestress of the prestressed concrete cross-section made of cast-in-situ concrete or of prefabricated concrete elements. The overall behavior of the tower shaft comprises an advantageous interaction of prestress, guying, and material resistance such that undesired frequencies may be excluded by a change in the tensioning degrees. The interaction permits an aerodynamic damping, despite the high rigidity of the tower structure, and a damping of the natural frequency.

Incidentally, the invention also comprises a device which can stabilize a generally guyed tower structure. Current data on the status of the tower structure, in particular on the tensile stress in at least one guy element of the tower structure, is determined during operation. The tensile stress in at least one guy element is actively modified depending on this data.

Due to the device the tower structure is adjusted during operation of the wind power plant to adapt the latter to different load conditions. The device is a motor-driven device which is also mounted permanently to the tower structure.

The guy elements may consist of coated parallel wire strands, coated strand bundles grouted with fat, galvanized wires, ropes, metallic bars, carbon fiber or glass fiber lamellas or similar which are anchored in their abutments or are embedded and fastened in their deflection saddles by rope eyes, bolts, weld seams, clips, screws, checking wedges, pulling heads or other connecting elements.

The invention preferably uses pulling heads as an end point along with a preferably load-alteration-resistant fastening made of wedge anchored strands, of strands mounted in a spherical manner, or of biaxially movable strands at the upper guy point of the guy elements. The invention preferably provides to use at the lower end an end point the length of which is variably adjustable via an actuator in the abutment, preferably also a tensioning device connected to the actuator.

According to the invention, the actuator can be moved by a drive in an open-loop or closed-loop controlled manner by at least one measuring element. The control unit monitors the prestress and the oscillation of the guy element and optionally also that of the tower shaft and the speed of the rotor unit and the position and deflection of the wind generator. The control unit may also monitor the quality and speed of the air mass flowing in front of the rotor such that the prestress in the rope can be adjusted automatically with a measuring element. On the one hand, the optimal prestress is then ensured over the entire course of the year with its temperature profiles and the associated thermal changes in length, and, on the other hand, if necessary, the prestress is to be adapted depending on the rotor speed. In particular, the effect of the variable prestress keeps the rotor excitations, such as p and 3p for example, and the natural frequencies of the tower and those of the guy elements separated from each other, and the kinetic energy contained in the air is to be extracted as optimally as possible by the response behavior of the overall WPP. In terms of the tower less material resistance needs to be opposed to the occurring extreme loads. This should, in particular, be the case if the frequencies of these components can otherwise not clearly be separated from each other for design reasons. The variable tensioning force applied by the actuators to the guy elements changes the natural frequencies of the tower and that of the guy elements so that the rotor is no longer subject to speed limitation. Furthermore, this device composed of a measuring element and of an actuator counteracts earth motions such as sources or swallow holes in an advantageous and very reliable manner. The same applies to changes in length caused by temperature. The control element may be a component of a Condition Monitoring System of the overall WPP.

In a variant of this feature for changing the prestress in the guy element, a secondary retaining element is proposed which is fastened to the guy element and is preferably guided back to the tower shaft and is also fixed there. In the variant, this secondary retaining element is equipped with an actuator such that its length may be varied and such that it can deflect the guy element laterally. For example the element can pull it closer to the tower by fetching or move it away therefrom by loosening. This lateral deflection, preferably at half length of the guy element, modifies by the geometrical change both the tensile stress and the natural oscillation in the guy element. According to the invention, this additional (or reduced) tensile stress in the guy element has a defined influence on the prestress in the tower shaft and thus modifies the natural frequency or the deflection thereof temporarily in a desired manner. In this way, the natural frequency of the tower shaft and the excitation frequencies of the large components of the wind generator, in particular p and 3p, do not come into conflict with each other.

The invention also relates to a tower structure for a wind power plant by which the tower shaft is guyed at least in sections. At least one guy element is coupled to a device for the variable adjustment of the tensile stress of the guy element.

The device for the variable adjustment of the tensile stress in the guy element of the wind power plant for a temporary change in the tower natural frequency, and for a differently adjustable response behavior, for example, for a different degree of the deflection is as such already inventive and not limited to steel concrete towers or the proposed combined construction. In particular a use of this device for guyed and pure steel towers is also conceivable.

The transition pieces are, for example, intermediate flanges in particular made of metal which are mounted to the tower shaft, or directly steel masts or steel mast components or similar. Furthermore, it is also possible to place the nacelle or a steel mast onto the transition pieces. In case of rotors having a vertical axis, the transition pieces are elements which establish the connection between the tower tube and the vertical generator unit.

The guy elements can, in particular, additionally be prevented by oscillation damping elements from being excited to oscillate. Oscillation damping elements may be of active or passive nature and, in particular, be friction dampers, induction dampers, hydraulic dampers, preferably close to the lower guy point, as well as oscillation damping masses, retaining elements at division points of the guy elements, such as secondary retaining ropes, for example, or similar.

The length of the guy elements, the guy angle and the applied tensioning force in connection with the material resistance of the tower shaft and the possible prestressing force thereof are in particular adapted to each other. Thus the natural oscillations of the guy element does not affect or restrict the operability of the guyed tower structure by resonances of the guy element. The use of oscillation damping elements additionally increases this safety by damping and neutralizing for example wind-induced oscillations and possible occurring harmonics or galloping.

The lower guy points of the guy elements extending radially away from the tower can, in particular, be anchored in own foundations or be anchored in a common foundation with the tower shaft. In case of multiple guys at different heights on the tower shaft, the guy elements can in particular be anchored on the ground in common foundations.

The guy elements may, in particular, separate and fork so as to run towards the upper guy point, and can be fixed in the middle or tangentially or therebetween at the tower shaft or be deviated there.

For the tower shaft or for parts of the tower shaft, in particular prestressed concrete shafts made of cast-in-situ concrete or prefabricated parts are in particular used, particularly between the base point and the uppermost guy point, which in comparison with tubular steel shafts and lattice mast constructions behave at the large slenderness in a considerably more torsionally rigid manner and with less oscillations due to the mass inertia of the concrete. The overall system of the WPP tower becomes more resistant to oscillations and thus more powerful and fatigue-resistant.

According to the invention, a lateral turning away of the wind generator in case of laterally flowing winds, of a horizontal wind shear or turbulences is avoided by the considerably higher material resistance of the prestressed concrete tower shaft portion. This has a positive influence on the service life of all components here under stress.

The required prestress for either lower or higher prestressing amounts to be applied to the concrete shaft portion below the upper guy anchoring point up to the lower end of the prestressed concrete shaft is in particular realized not only via the tension members in or at the tower but partially also via the guy.

The natural frequency of the tower due to the connection of the force of the guying and the force of the prestress is, in particular, freely selectable, and the 'forbidden speed ranges' for the rotor are in particular completely cancelled. With respect to the excitation frequencies p and 3p of the rotor, the tower natural frequency preferably behaves "hard/hard" according to the Campbell-diagram, such that in particular the low speed ranges of the rotor can now be used and a higher wind yield can be achieved.

The interaction of mass inertia, material resistance, modifiable guying and, if necessary, additional prestress in the tower structure can, in particular, adapt the oscillation properties of the tower to the periodic load application of the rotor. Thus the fatigue load of the tower structure is reduced as a result of lower resonances and thus it is additionally economically possible to accommodate several rotors one on top of each other on one tower axis.

In particular, the prestressed concrete shaft or parts thereof may not only be made of steel concrete but also of textile concrete, in particular carbon fiber (prestressed) concrete, AR glass fiber (prestressed) concrete or of combinations of these types of reinforcement. Both the conventional steel reinforcement, but in particular the proposed textile reinforcement can be applied diagonally in the peripheral direction. Permanent formwork and sandwich elements can also make a contribution to improve the torsion resistance.

The tower construction can continuously be made of the proposed prestressed concrete shaft from the base point of the tower construction up to the transition piece (here: adapter element) at the transition to the wind generator. The concrete shaft may preferably be manufactured in slipforming constructions without crane. The placing of large cranes or of tower cranes and necessary areas for the provision of large cranes or of prefabricated parts or similar becomes unnecessary for the entire building period of the concrete tower shaft when using slipforming. The outer finishing of the concrete tower shaft can preferably be a textile-reinforced fine concrete layer. In one variant, the outer skin of the concrete shaft may also be a permanent formwork, also of metal, also a sandwich element.

The base point of the tower construction may have a preferably prefabricated component or a shaft portion in which the lower tension member abutments are integrated above ground. Preferably the space and maneuvering surface to fasten the tensioning devices for assembling and applying the prestress of the tension members for assembling purposes are also kept above ground. This makes the so called "tension-cellar" unnecessary. A variant of the invention provides that the tension members at the tower base are deviated outwards and that the tension member abutments are fixed outside to the tower. The tower interior is thus free for all installations which are to be protected against the weather. According to the invention, the access openings to the interior, and possibly necessary installation ducts, can also be located in this prefabricated component.

The access-door is preferably located below the tension member abutments. This is particularly advantageous if all tension members of the tower shaft are guided into the component at the tower base and the distance of the tension members from each other would otherwise not permit any opening with the required width for an access-door.

The tower shaft can in particular be erected on foundation constructions which cannot receive any, or which can receive only little, lever forces. This includes, for example, a simple placing of a concrete-slab or the fixing on native good bearing rock, bored pile foundations in soft subsoils or other foundation props which are merely limited in their load-bearing-capacity to the vertical direction. The dimensions of all foundation-types are no longer determined by (lever) forces. No tilting or strong one-sided loads due to a main wind direction need to be considered, except those loads during construction, as long as the tower or the portions thereof are freestanding. Due to the tower foundation which preferably projects only little laterally and therefore has small lateral dimensions, the space required for the tower construction method is considerably reduced. This counts in particular in comparison with previous base structures for freestanding tower structures having a very large spreading at the tower base due to the lever forces and the foundation structures widely projecting laterally to prove the tilt resistance.

The outer diameter or the outer geometry of the prestressed concrete shaft can be constant over the entire length thereof, and required or possible changes in the necessary cross-sectional area of the shaft wall can be obtained by a variable inner diameter or a variable inner geometry. It is in this way easier to move a maintenance device in the vertical direction at the exterior side of the tower.

Concrete types of different densities and different reinforcement degrees and geometries can be used in the shaft wall to additionally positively influence the oscillation behavior of the tower shaft and to suppress natural frequencies and harmonics.

The prestressed concrete tower portion can extend up to below the transition piece to the wind generator. In one alternative the prestressed concrete tower portion extends up to a transition piece onto which a tower crown is placed, for example lightweight or tubular steel segments. A possible transition piece to further tubular tower elements which can be used in the upper part of the tower construction for weight reasons in particular forms at the same time the upper, possibly the sole guy anchoring zone of the tower construction and the area for the upper abutment or the reversal bearing of the tendons of the tower shaft. This guy abutment on the tower shaft is generally referred to as transition element. In wind generators having a horizontal axis, this transition element is preferably arranged close below the rotor diameter. According to the invention, the lighter tower portion may preferably be built above the upper guy anchoring in accordance with lightweight building methods, also of steel, of sandwich elements and of wood. Each of the building methods in the form of a body enclosing a cavity, or as lattice structure, or as a combined construction.

The upper guy point is located at a height between the spire and the base point of the entire tower construction which divides this length preferably in a ratio of one to two or in a ratio therebelow.

A possible lower guy point is located at a height between the spire and the base point of the entire tower construction, which divides this length preferably in a ratio of two to one or in a ratio thereabove.

The tower shaft and the lower guy anchoring points can be fixed in the individual foundations. A variant of the invention however provides that in case of very soft grounds, webs extend from the tower foundation to the outside in a star-shaped manner, which receive the forces of the guy elements and guide them back to the tower by a deviation of the force in a second tension element. In this way, it is also possible to ensure a closed circumferential force progression also in case of very soft grounds. Furthermore, a variant provides a flat, conical foundation which is preferably placed in a flat manner on the subsoil and can easily be completely removed upon disassembling.

In particular multistory plants with several wind generators can be realized in an arrangement one on top of the other in accordance with the proposed tower building principle.

Incidentally, the invention also relates to a method of stabilizing a tower structure as described above. During operation of the wind power plant, current data on the status of the tower structure, in particular on the tensile stress in at least one guy element of the tower structure is determined by a measurement-element and the tensile stress in at least one guy element is actively modified depending on this data.

The features described above and specified in the device claims may explicitly also be provided in the method.

BRIEF DESCRIPTION OF THE DRAWINGS

Further features and advantages of the invention will become apparent from the description and the drawings below to which reference is made. In the figures:

FIG. 7a schematically shows one example of prestressing and guy forces according to the invention.

FIG. 7b shows another example of prestressing and guy forces according to the invention.

FIG. 8.1 shows a rough section through a building method according to the invention.

FIG. 8.1.A is an enlargement as identified in FIG. 8.1.

FIG. 8.2 is another example section according to the invention.

FIG. 8.2.A is an enlargement as identified in FIG. 8.2.

FIG. 8.2.B is an enlargement as identified in FIG. 8.2.

FIG. 8.3.1 is a Campbell diagram that shows a hard/soft design of the tower according to the prior art.

FIG. 8.3.2 is a Campbell diagram that shows a resonance/soft design according to the prior art.

FIG. 8.3.3 is a Campbell diagram that shows the advantageous effect of the invention.

FIG. 11 shows another foundation example of the entire tower according to the invention.

FIG. 18a shows one example of tension members according to the invention.

FIG. 18b shows another example of tension members according to the invention.

FIG. 18c shows another example of tension members according to the invention.

FIG. 19a shows another example of tension members according to the invention.

FIG. 19b shows another example of tension members according to the invention.

FIG. 19c shows another example of tension members according to the invention.

FIG. 20a shows an example of a butt joint.

FIG. 20b shows an example in which a layer is applied to an exterior side.

FIG. 20c FIG. 20c shows an example in which a tower shaft emerges inside from a base element 60.

FIG. 21a shows the same thing as Figure as FIG. 20c but from the outside.

FIG. 21b shows an example of a tower shaft on a foundation.

FIG. 21c shows an example of an access opening 72 configuration.

FIG. 22a shows one example of an inner wall development and arrangement of tension members.

FIG. 22b shows another example of an inner wall development and arrangement of tension members.

FIG. 22c shows another example of an inner wall development and arrangement of tension members.

FIG. 22d shows another example of an inner wall development and arrangement of tension members.

FIG. 23a shows another example of an inner wall development and arrangement of tension members.

FIG. 23b shows another example of an inner wall development and arrangement of tension members.

FIG. 23c shows another example of an inner wall development and arrangement of tension members.

FIG. 28a shows a WPP in a first condition.

FIG. 28b shows a WPP in a second condition.

FIG. 28c shows a WPP in a third condition.

FIG. 28d shows a sectional view through a tower shaft with exemplary tension member elements.

DETAILED DESCRIPTION

Figure 1:
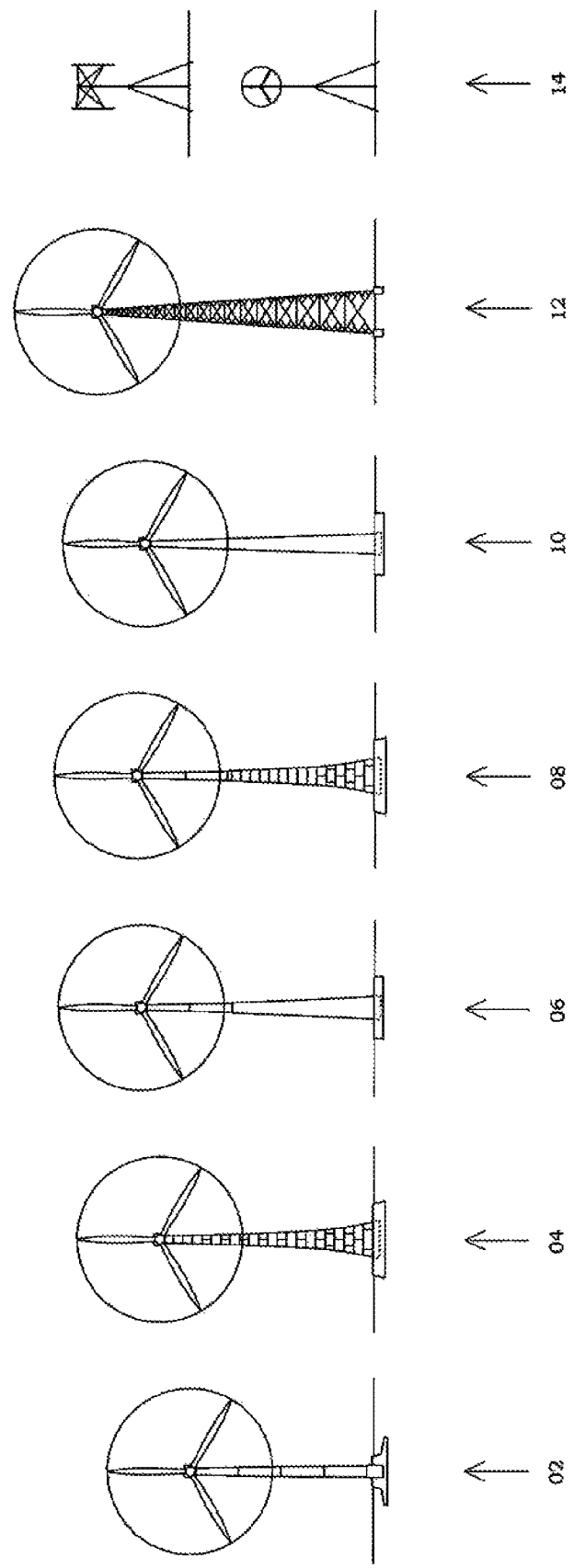
FIG. 1 shows a listing of WPP towers currently available on the market.

FIG. 1 shows a listing of WPP towers 02-14 currently available on the market and of current trends according to unanimous opinion of experts. WPP tower 02 schematically shows a tower on a foundation body made of several steel pipe sections having a solid web cross-section. WPP tower 04 shows a schematic concrete tower of prefabricated parts on a foundation body. WPP tower 06 shows a freestanding hybrid tower which is made of cast-in-situ concrete in the lower portion and of steel pipe portions in the upper portion. WPP tower 08 shows a modified building method in which the concrete section is composed of prefabricated parts. WPP tower 10 shows a pure cast-in-situ concrete tower on a foundation body. WPP tower 12 schematically shows a lattice mast. This building method which is usually based on individual foundations reaches, according to the prior art, the highest hub heights. WPP tower 14 shows commercially available small wind power plants having a horizontal and a vertical axis guyed on a steel tube.

Figure 2:
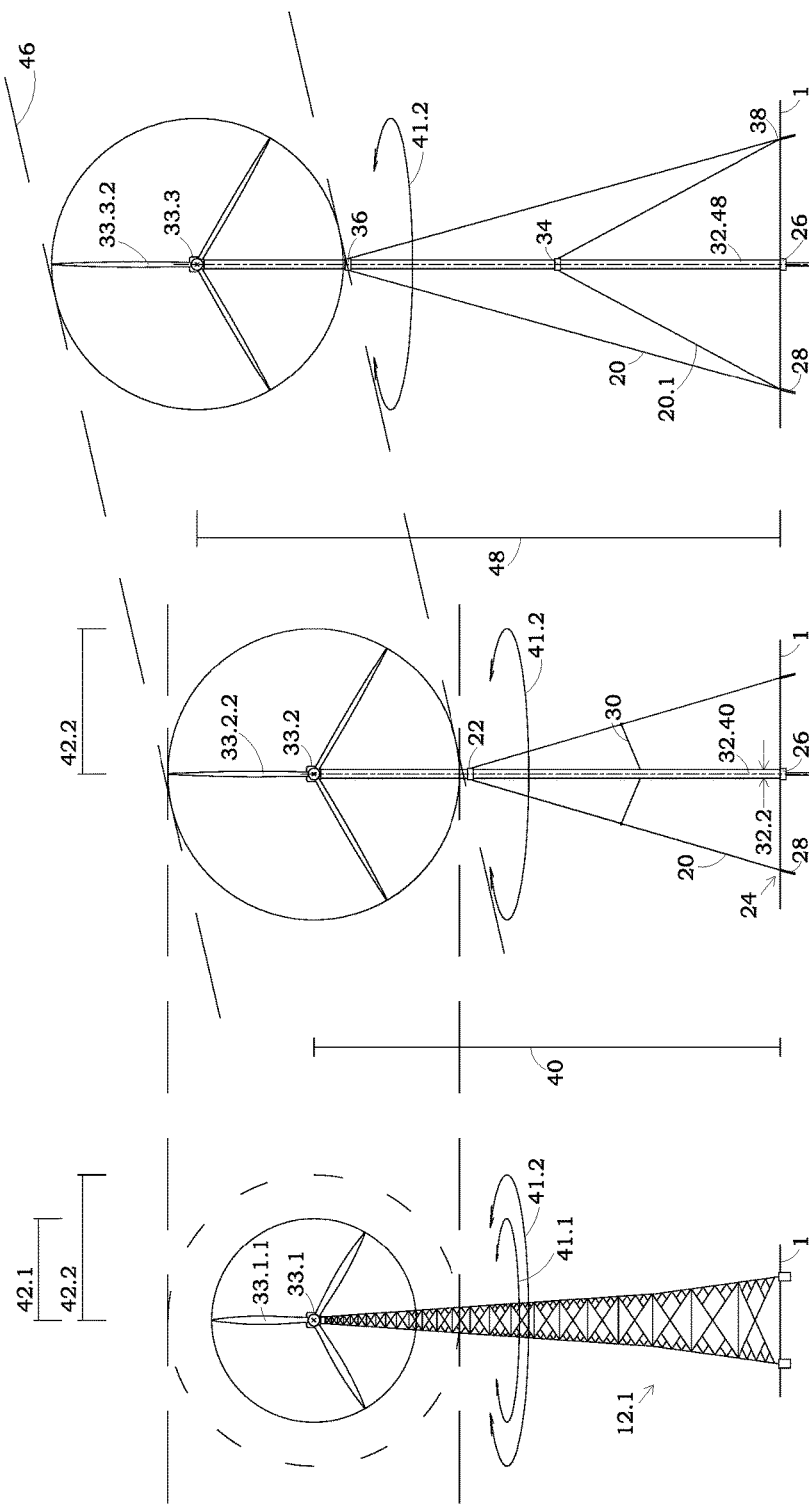
FIG. 2a shows a prior art WPP tower.
FIG. 2b shows one example of a WPP according to the invention.
FIG. 2c shows another example of a WPP according to the invention.

FIG. 2 explains a core problem from which the invention results. FIG. 2a shows a WPP tower with a very high hub height 40 onto which a wind generator 33.1 with a rotor blade type 33.1.1 having a blade length 42.1 is mounted. This rotor blade type is suitable for mean wind profiles having a Weibull maximum at mean wind velocities. The rotor blade length is accordingly short in comparison with the dimensions of the overall plant. According to the prior art, this high hub height 40 with the generator 33.1 can be realized economically merely using the represented lattice mast construction 12.2. The lattice mast construction must not only receive the lever arm forces over the length 40 but also receives the torsional forces 41.1 resulting from the blade length 42.1. In consequence this requires an appropriate spreading at the tower base. This longer blade accordingly increases the torsional forces 41.2 applied to the tower construction and makes the chosen construction, according to the prior art, uneconomical.

FIG. 2b shows the invention in which the wind generator 33.2, which is particularly adapted to sites with light winds and has slender rotor blades 33.2.2 having a long length 42.2, is mounted onto the guyed tower shaft according to the invention. The shaft 32.40 is configured as a torsion-resistant concrete hollow body. The shaft transmits the occurring torsional forces 41.2, despite the very high slenderness 32.2, in a material saving manner from the wind generator 33.2 into the foundation element 26. The bending moment of the tower shaft is transmitted through a guy 20 fastened to the tower shaft 32.40 at a guy point 22, preferably just below the rotor diameter. The guys are arranged radially about the tower shaft 32.40 at the guy anchoring points 24. From the guy anchoring point 24 the force is then transmitted into the foundation 28 and the subsoil. In order to reduce the free oscillation length of the guy, the guy element 20 can be held by a secondary element 30 that divides the entire length of the guy into sections.

FIG. 2c shows a variant of the invention which makes the trend 46 towards increasingly large WPPs having increasingly high hub heights 48 for the operation of increasingly powerful plants 33.3 having increasingly long blades 33.3.2 in more profitable higher wind layers possible. The slender and torsionally rigid concrete tower shaft 32.48 is held by an upper guy anchoring point 36 preferably below the rotor diameter, and by a lower guy anchoring point 34 which removes additional moment forces from the tower and guides them to the subsoil 1 via the guy elements 20 and 20.1. According to the invention, the guy anchoring points at the low end can be anchored in the subsoil 1 via one common foundation 28.

Similar to rotors with a horizontal axis, rotors having a vertical axis can also be mounted in the same manner at high heights. See e.g. FIG. 25.

FIGS. 3 to 7 illustrate relevant values schematically explaining why the construction principle according to the invention suggests a combination of two different prestressing methods: In brief the invention provides regular vertical prestress in the concrete tower applied by tension-members plus an additional prestress acting on the tower caused by the guy-members. The hatched areas in the FIGS. 3 to 7 symbolize forces, moments and material characteristics.

Figure 3:
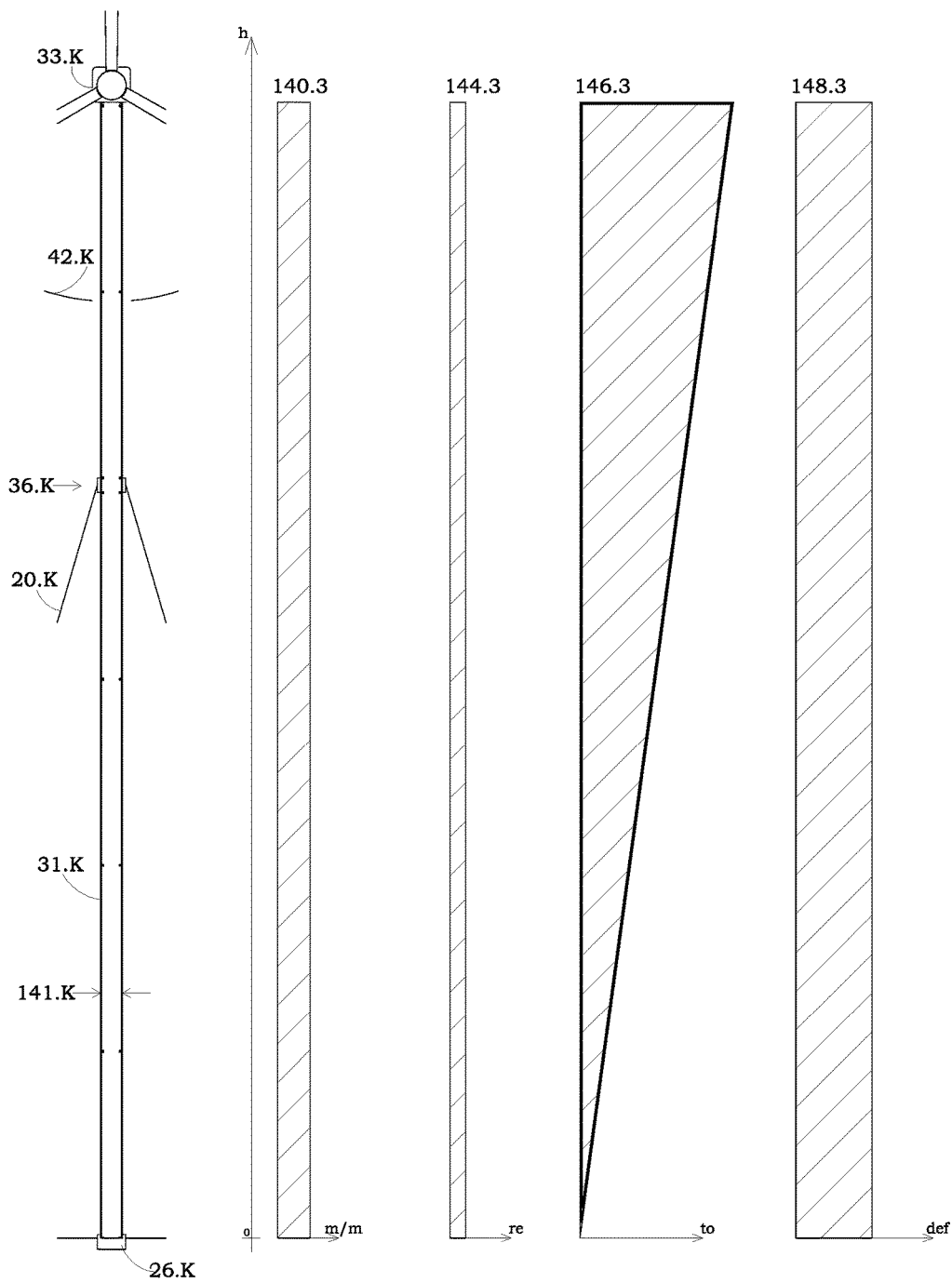
FIG. 3 shows an existing construction of a prior art WPP.

FIG. 3 first shows an existing construction of a small wind power plant composed of a steel tube 31.K having a solid web cross-section and a guy 20.K with a guying point 36.K, shown in a simplified sketch. The slim hatched area 144.3 symbolizes the low moment of resistance ("re") of this building method. The large slenderness and the low moment of resistance of the tower tube 141.K generates a torsional deflection. This is symbolized by the hatched triangle 146.3 ("to"). The broadness of the triangle symbolizes the amount of torsional deflection. The torsional deflection considerably increases upwards towards the generator 33.K in case of lateral forces acting on the small wind generator 33.K, as illustrated in FIG. 2. The moment of resistance of the material ("re"), symbolized in the slim hatched area 144.3 and the low mass per meter of height ("m/m"), symbolized in the slim hatched area 140.3, mean an appropriately high lateral, longitudinal and torsional excitation susceptibility along and about the own axis over the entire length of the shaft. This torsion ("to") is shown in 148.3. The low moment of resistance, symbolized in 144.3 of such a guyed construction does not permit any upscale of this building method. A safe and economical operation of the wind generator, in particular in multi-megawatt plants as from 2MW installed capacity onwards, is not ensured with the given softness and the extreme slenderness. The maximum possible deflection at the upper end of the tower gets to large and several exciting interferences of the oscillations, in particular of tower natural frequencies, tower torsion, blade natural frequencies and the excitation by the blade rotation p and 3p are becoming too big and numerous.

Figure 4:
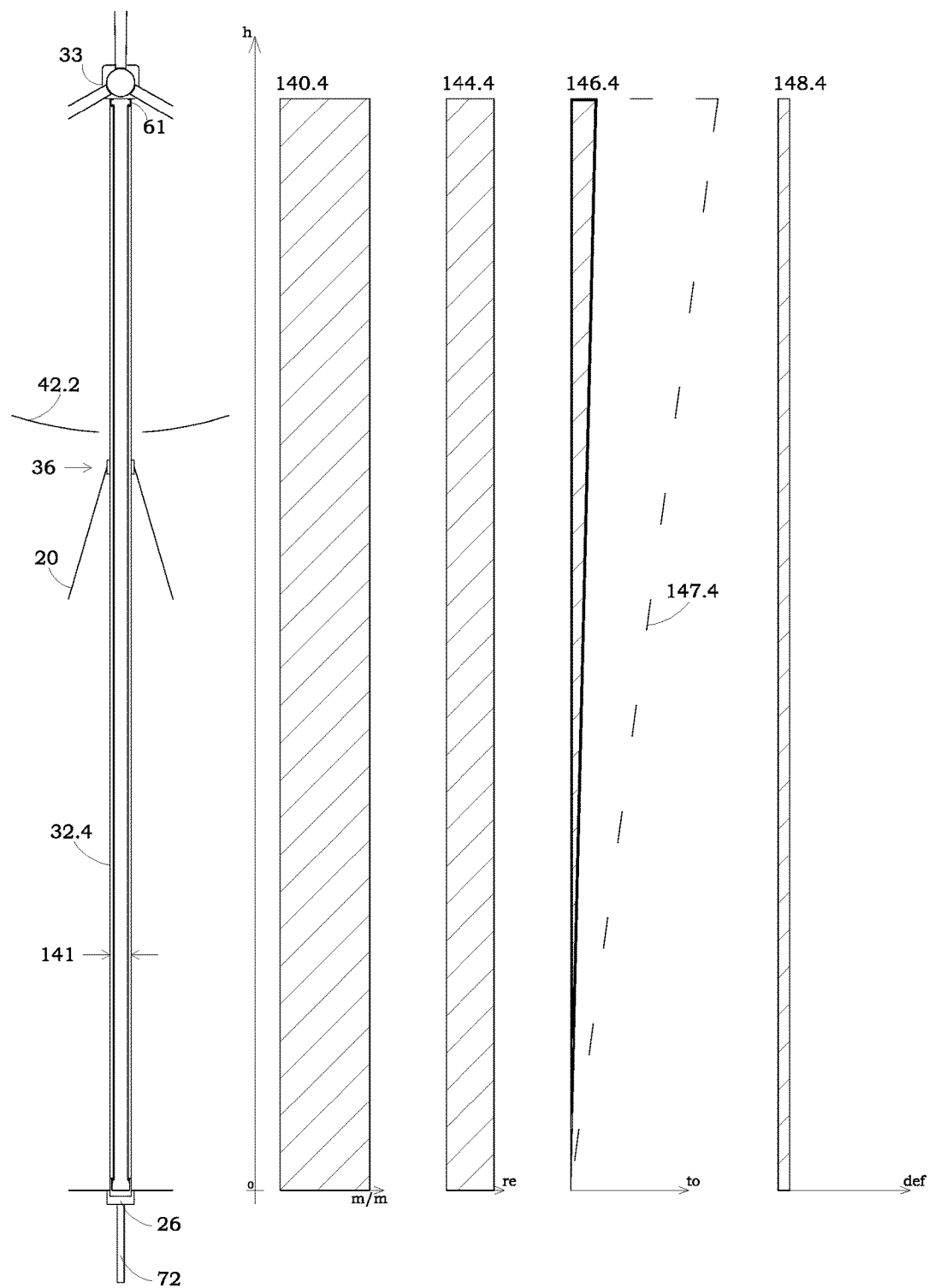
FIG. 4 shows one example of a building principle according to the invention.

FIG. 4 shows the building principle according to the invention in which a concrete hollow body, preferably a concrete tube under prestress, is provided with a guy 20 fixed at the anchoring point 36. The substantially higher specific weight per meter of the tower-shaft is represented in the diagram 140.4. The very high material resistance of reinforced concrete, in particular of prestressed concrete is represented in the diagram 144.4. The material resistance reduces the values of the maximum torsional deflection, schematically shown in the diagram 146.4. The torsional deflection upon the same load induced from the generator 33 gets reduced to fractions of the building method that has been described and shown in FIG. 3 (broken triangle line in the diagram 146.4 in comparison to the slim hatched triangle). The excitation susceptibility, both laterally and longitudinally, and about the own axis, is considerably reduced over the entire length of the shaft. This is graphically shown in the diagram 148.4. Thus the building method comprising a guyed and prestressed concrete shaft permits a safe operation of the wind generator 33 also in high heights still using material-efficient slenderness 141.

Figure 5:
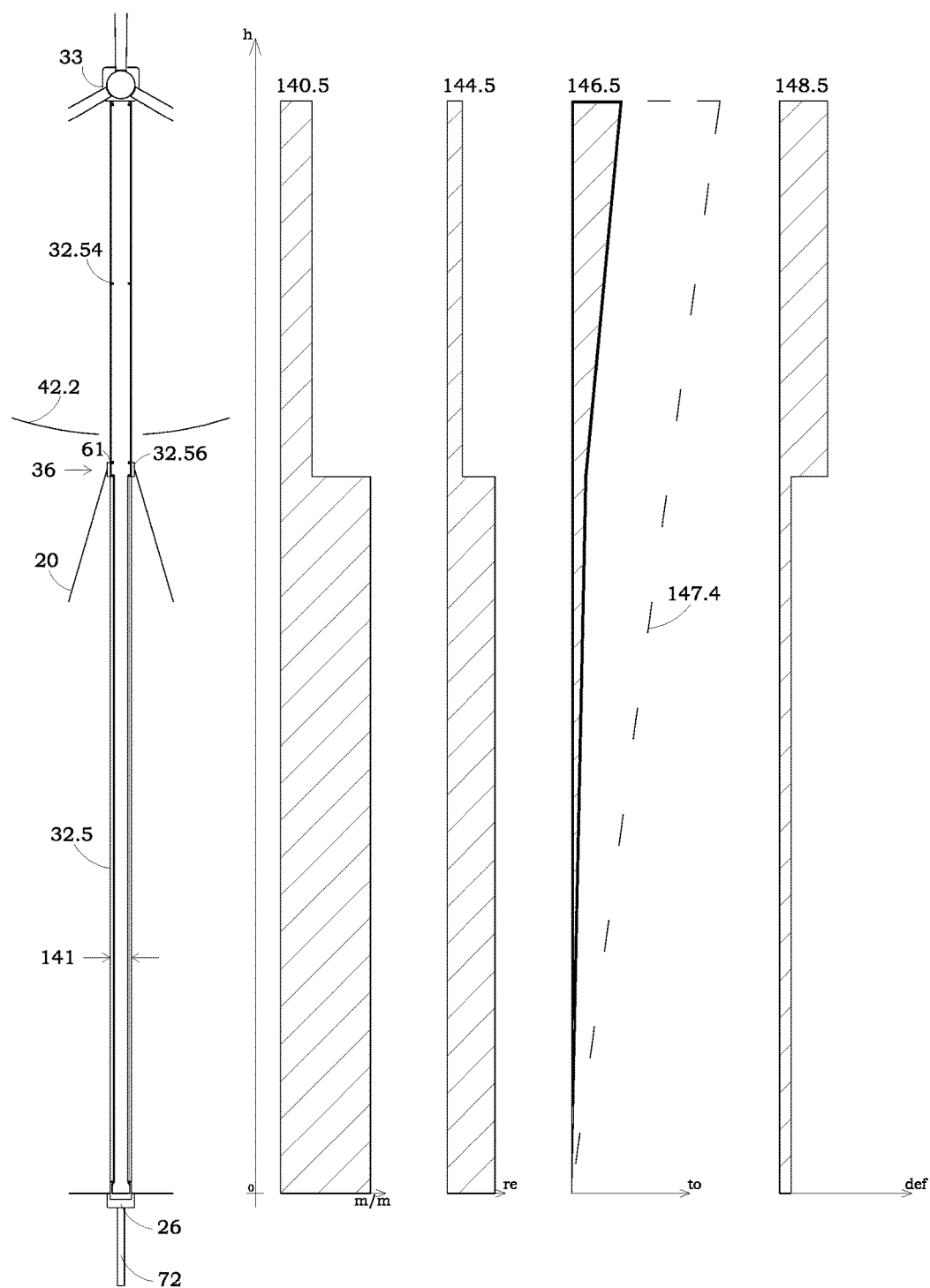
FIG. 5 shows another example of a building principle according to the invention.

FIG. 5 shows a variant of the building principle according to the invention in which the concrete shaft 32.5 is built up to a guy 20 having a guy anchoring point 36, which is preferably mounted to a transition element 32.56 onto which a tower crown of further elements 32.54 in lightweight designs can be placed. These elements of the shaft supporting the generator 33 have a lower material resistance. In this embodiment, the transition element constitutes at the same time the so called "transition piece". This building method can in particular be useful when the tower structure should not, or must not, exceed a certain total mass and light. Then softer building methods are used in the upper part of the tower. The torsional deflection, represented in the diagram 146.5 and the maximum susceptibility to excitation, represented in the diagram 148.5 are also considerably lower in this combination made of a plurality of tower portions having different building methods than that illustrated in FIG. 3.

Figure 6:
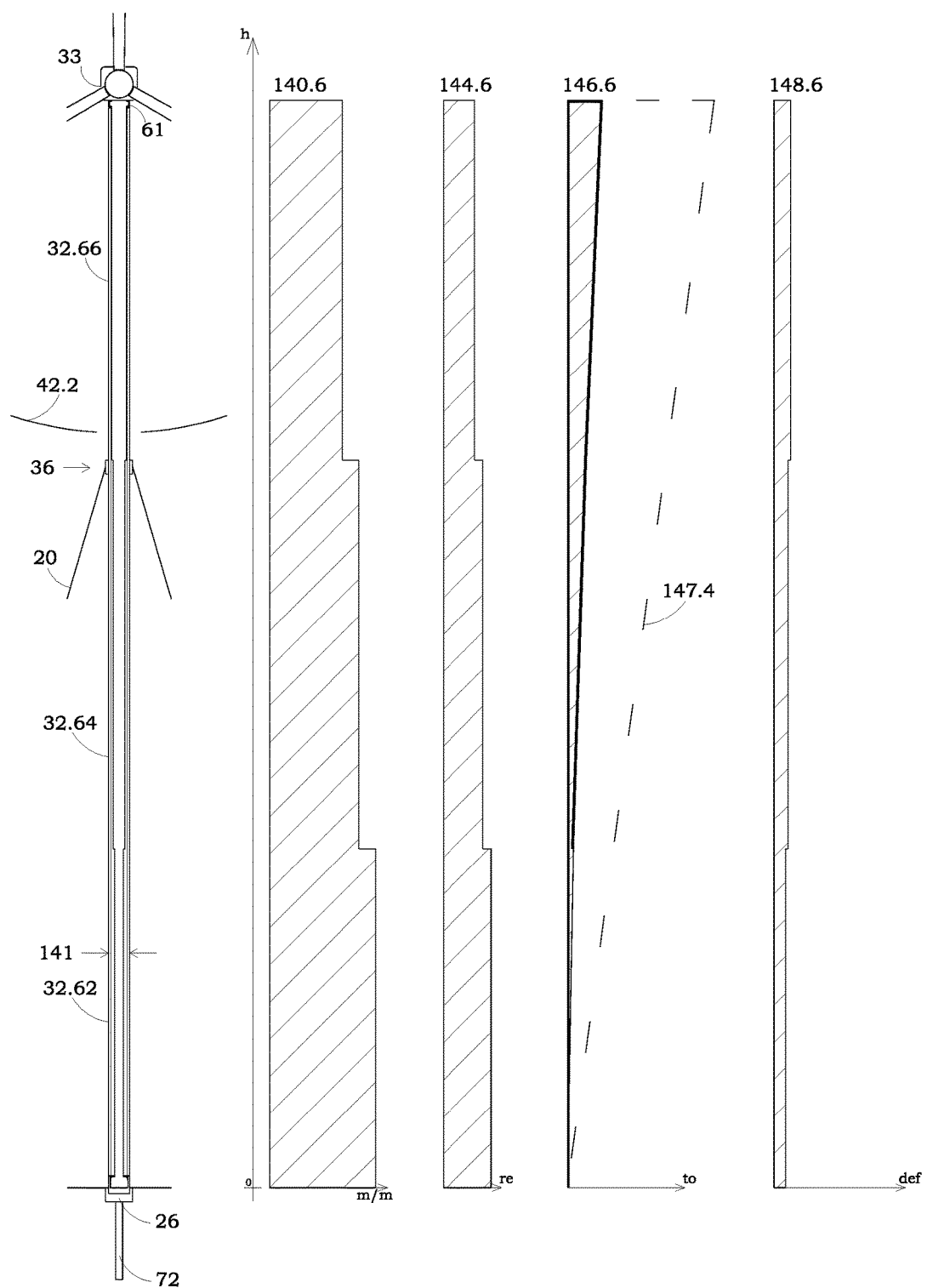
FIG. 6 shows another example of a building principle according to the invention.

FIG. 6 also shows a preferred variant of the principle according to the invention in which different concrete wall thicknesses 32.62, 32.64 and 32.66 having different specific weights per meter in the tower-shaft are used. The decreasing wall thickness of the shaft wall and the stepwise decreasing specific weight per meter, shown in the diagram 140.6, and a constant outside slenderness, shown in the diagram 141 are used in this variant. Different concrete property classes having different material resistances, shown in the diagram 144.6, can additionally be used in building. The torsional deflection, shown in the diagram 146.6, and the excitation susceptibility, shown in the diagram 148.6, are both very low also in this case. Furthermore, such a building type avoids very efficiently possible harmonics over the entire length of the tower as each shaft portion has different natural frequencies despite the identical outer diameter.

Apart from rotors having a horizontal axis, with respect to rotors having a vertical axis, in particular the low capacity to be excited of these constructions with their mentioned properties are to be cited here.

Combinations of the methods of building are also possible.

FIG. 7 schematically shows the prestressing and guy forces and the advantageous addition thereof.

FIG. 7a shows the preferred variant in which the prestressed concrete shaft extends from the base of the tower and the preferred base element 60 (explained further below) up to the transition piece 61 at the upper end of the tower below the wind generator 33. The prestressing force, symbolized as a hatch 52 along the tower shaft 50 is preferably applied over the entire length of the tower. This amount of prestressing force applied to the shaft is complemented by the prestressing force, symbolized as the hatch-bar 54 of the guy ropes 20. In this way, an overall prestress 56 is produced, which advantageously sums up to total required prestress-load to the shaft cross-section and thus confer the necessary rigidity to it. According to the invention, the guy elements undertake not only the function of preventing the lateral tilting, but also part of the required prestress-load of the concrete tower shaft.

FIG. 7b shows a variant in which the prestressed concrete shaft 57 extends from the base of the tower 60 to the guy anchoring point 36 and is acted upon with an inherent prestress, symbolized by the hatch-bar 58. It is preferably guided from there after a transition piece 61 as non prestressed component 55 up to the head adapter 61 of the tower below the nacelle 33. The tensioning forces, symbolized as the hatch-bar 58, of the tension members along the tower 57 and the tensioning force 54 of the guy elements 20 complement each other also in this case in an advantageous manner to form a common prestress, symbolized by the hatch-bar 59. The tower shaft obtains the necessary rigidity with the total required prestress-load by the summarized forces.

FIG. 8.1 shows on the right side, by way of example, a rough section through the building method according to the invention and in the enlargement 8.1.A component parts of the abutment with the actuator 166 of the guy 20 at the lower end. These elements are preferred components of the invention in terms of their functionality. The guy element 20 is fixed in the abutment element 154 by a fastening element 156, for example a rope eye, and is mounted to be movable in the longitudinal direction ("x") of the guy by an actuator 166. Both conditions about prestress and possible oscillations of the guy element are transmitted via a sensor 162.1, which can preferably be fastened to the guy element. The sensor reports the data to a logic unit 164 that can output control signals for retensioning or slackening the guy element for the actuator. Further sensors that are not shown in the diagram are optionally provided on the tower shaft to monitor the oscillating behavior thereof, connected to 162.2, on the rotor unit to monitor the speed connected to 162.3, and, if necessary, also in the rotor blade to monitor the natural frequency thereof connected to 162.4. This logic processing unit 164 can set off the rotor speed, the tower oscillation, the rope oscillation, the rope tension and further required values against each other, and thus output the control signals for retensioning and slackening the guy element to the actuator. A damping element 158 not far from the abutment reduces, in particular, wind-induced oscillations of the guy element. The abutment is preferably embedded in a foundation 152 which delivers the loads to the subsoil via foundation elements 150, such as rock anchors, rock nails, gravity foundations, soil anchors or similar structures. The broken line 20.1 illustrates that several guys extending to several points at the tower can be unified in one common foundation.

FIG. 8.2 shows a variant in which the tensile stress in the guy element 20 is not generated at the base or head point thereof changing the length in the longitudinal direction with an actuator, but by a secondary element 30 which is fixed to the guy element and can thus modify the course of the guy element. The secondary element 30 pulls the guy element closer to the tower shaft and tensions it more strongly (20.A), or releases the guy element so that it returns to its initial position. To this end, an actuator 166.30 is also used which can move the secondary element 30 in the longitudinal direction thereof. The actuator is also piloted by a logic unit which processes the incoming data of the sensors 164.1, 164.2, 164.3 and 164.4 and calculates on this basis a value for the actuator. The actuator which tensions the guy element with the secondary element 30 in a way that the increasing or decreasing tensile forces, along with the prestress of the tower shaft, complement each other. Thus it is granted that the excitation frequency and the natural frequency always remain separated from each other.

The guy generally extends radially outside the outer skin 400 formed by the exterior side of the tower shaft and obliquely downwards. The tension members responsible for the prestress of the concrete extend radially inside the outer skin, i.e. in the concrete or in the cavity formed by the tower wall, i.e. within the shaft.

FIG. 8.3.1-8.3.3 shows in three Campbell diagrams first the prior art and then the solution according to the invention. According to the invention the natural frequency f1-1 to f2-2 of the tower shaft can be adjusted in a variable manner due to the tension members that exert adjustable tensile stresses on the tower shaft. 8.3.1 shows a hard/soft design of the tower according to the prior art according to the most widespread building method of today. The first tower natural frequency f1 and the second tower natural frequency f2 are designed in a way that no interference of the natural frequency and the excitation frequencies in particular of the rotor blades 3p and the rotor rotation p occurs in a defined speed range (hatched area). Diagram 8.3.2 shows a resonance/soft design in which the first natural frequency of the tower structure f1 and the excitation frequency p has an intersecting point X in the speed range. Diagram 8.3.3 shows the advantageous effect of the invention with reference to the Campbell diagram: the tower natural frequency can be adjusted by the combination of prestress and variable guying, both together resulting to a specific range of f1-1 to f2-2. In this way, the intersecting points between the natural frequencies and the excitation frequencies can be avoided by designing the tensile stress of the guy elements in a variable manner. In contrast to the other tower designs, the nominal speed range can be chosen absolutely freely (larger hatched area). This in particular also applies for rotors having a vertical axis.

Figure 9:
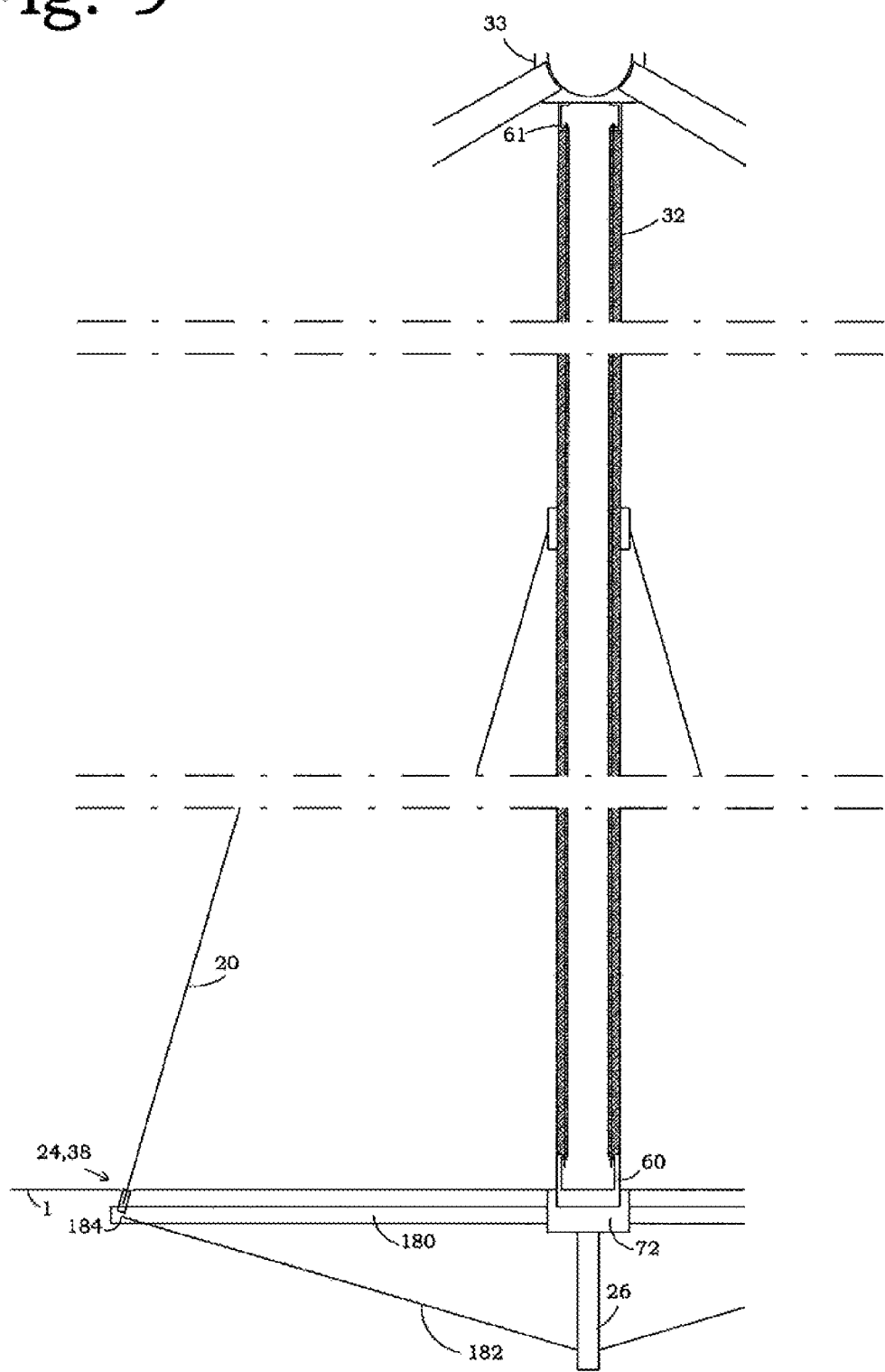
FIG. 9 shows a foundation example of the entire tower according to the invention.

FIG. 9 shows, by way of example, a foundation variant of the entire tower including the guying for very soft and not loadable grounds. In this case, the tensile force of the guy element 20 at the base point 24, 38 thereof is deviated via the tip of the girder element 180 which preferably projects from the tower foundation 72, and is returned via a tension element 182 in a star-shaped manner, as seen in a top view, and at a flat angle in this view, to the foundation 72 and additional foundation elements 26 of the tower shaft and is anchored there. In this way, excessive gravity foundations at the base point 24, 38 of the guy element 20 as a result of the occurring tensile forces in case of unsafe subsoil are avoided.

Figure 10:
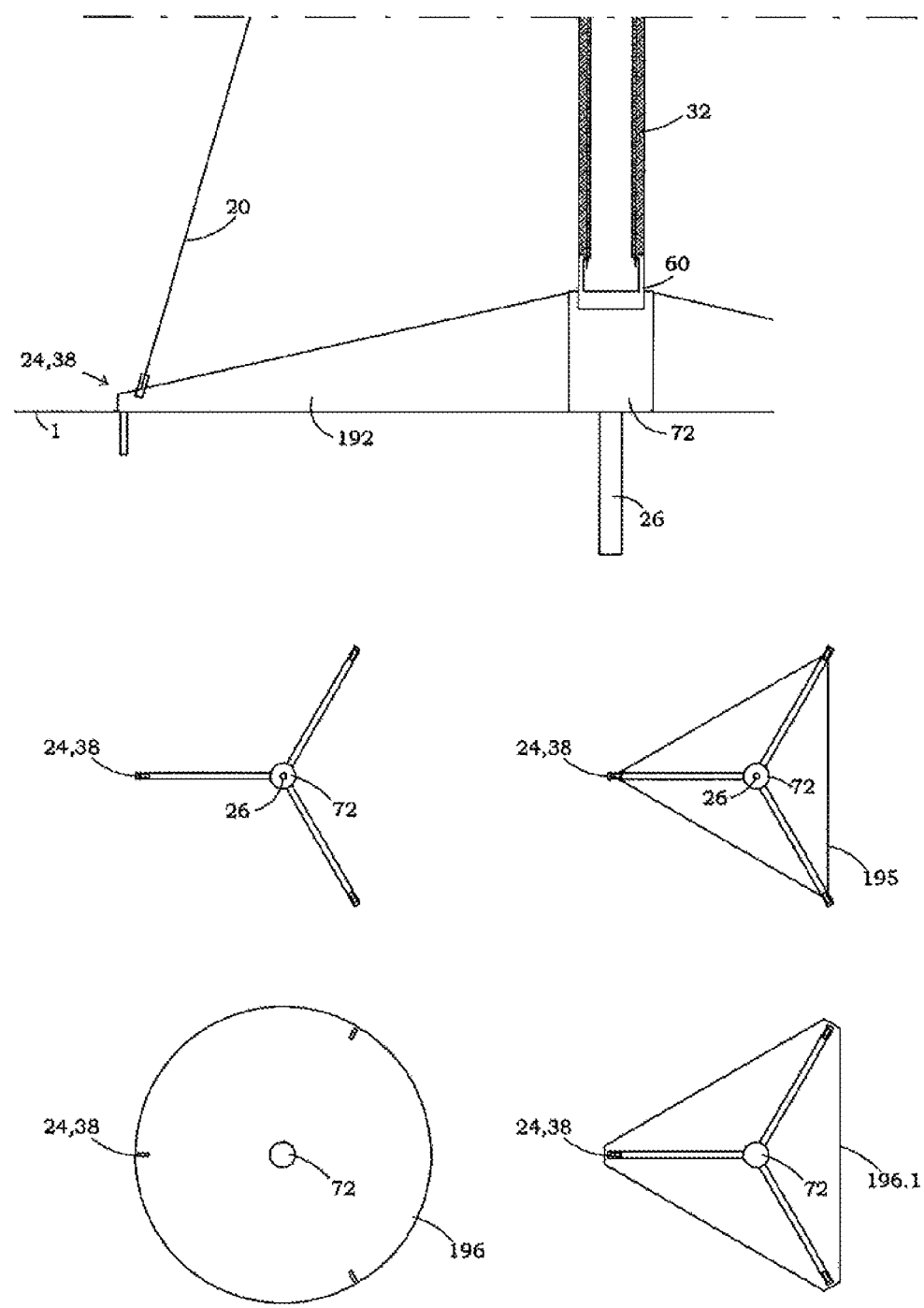
FIG. 10 shows another foundation example of the entire tower according to the invention.

FIG. 10 shows, by way of example, a variant of the tower foundation for unsafe subsoils in which a beaked girder 192 can optionally be guided away from the tower foundation 72 to the guy point 24 and 38. The tip of the beaked girder receives the guy element 20. Optionally, the beaked structure 196 is leading away from the tower foundation 72 and is configured in a plate-shaped, disk-shaped, or conical manner to ensure a sufficient stability. Optionally, the beaks are additionally connected to each other via tension elements 195 or form, as seen in a top view, a triangle, preferably a tetrahedron 196.1 to ensure the stability.

FIG. 11 shows, by way of example, a variant to FIG. 10 in which the element leading away from the tower is divided into an upper boom 198 and a lower boom 199 which together enclose a cavity 197 that can be filled with filling material for the purpose of stability.

Figure 12A:
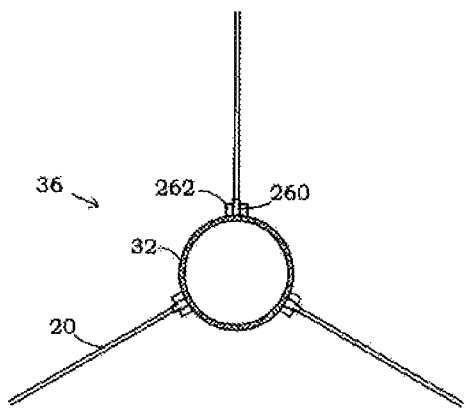
FIG. 12a shows an example of a guy element according to the invention.
Figure 12B:
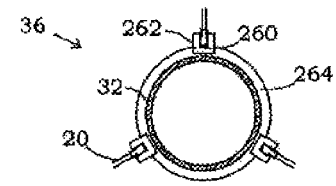
FIG. 12b shows an example of a reinforcing element according to the invention.
Figure 12C:
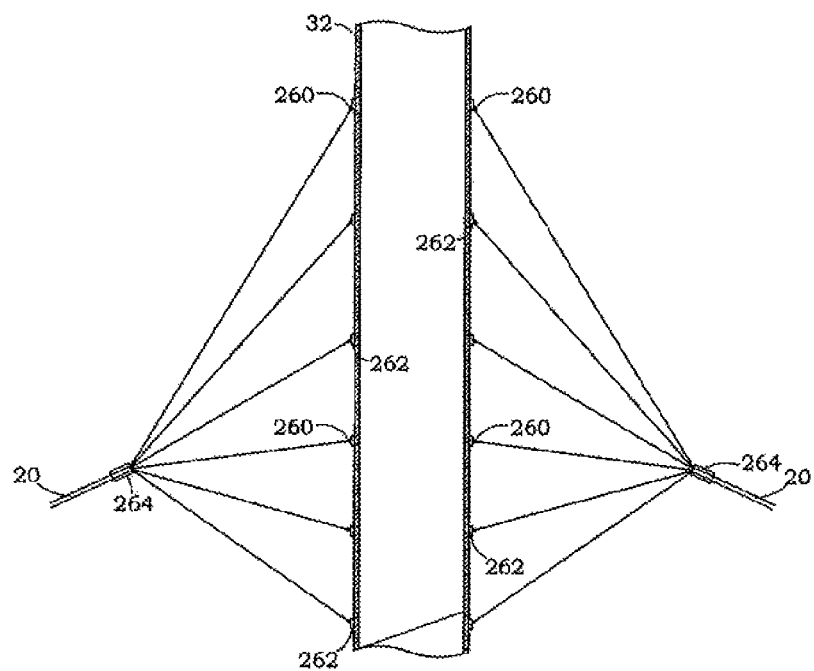
FIG. 12c shows another example of a guy element according to the invention.

FIG. 12a shows, by way of example, a variant of the guy anchoring point 36 in a very simple design. The guy element 20 is fastened in a receiving element 262 at the tower shaft 32 using an end piece 260. FIG. 12b additionally shows a reinforcing element 264 which prevents an ovalization of the tower tube or a bending of other possible tower geometries (for example of polygons) as a result of the applied tensile forces. The reinforcing element can be mounted inside or outside to the tower shaft. FIG. 12c shows, by way of example, a further variant in which the guy element 20 branches at an element of the branching 264. It is fixed at least at two points one on top of the other to the tower shaft. In this way, the maximum bending moment in the region of the guy is reduced, and stress peaks are avoided.

Figure 13A:
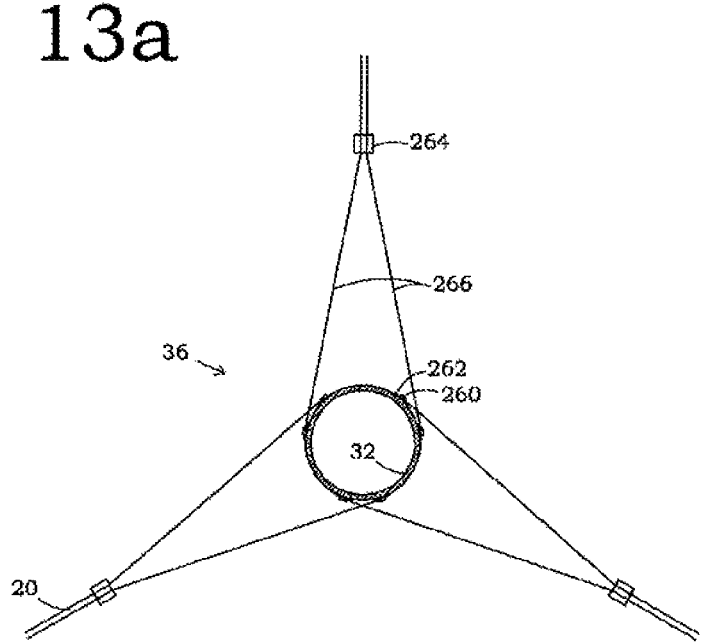
FIG. 13a shows another example of a guy element according to the invention.
Figure 13B:
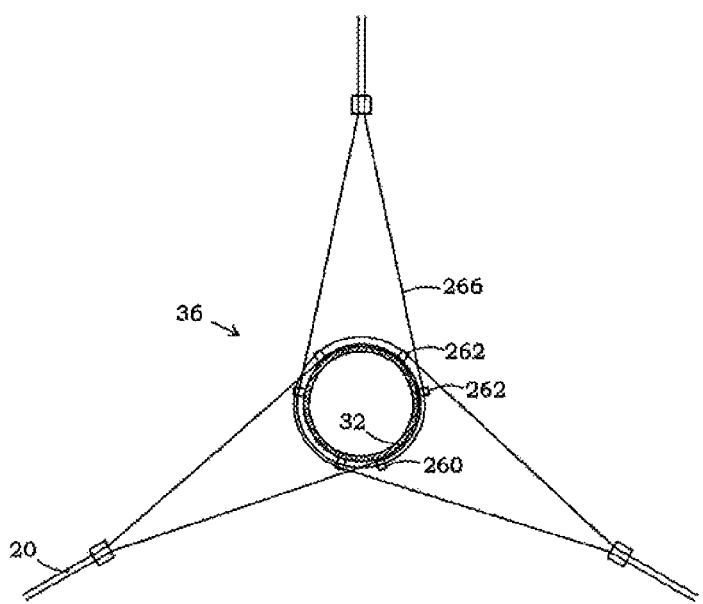
FIG. 13b shows another example of a guy element according to the invention.

FIG. 13a shows, by way of example, a variant of the upper guy point 36 in which the guy element 20 branches at an element 264 near this upper guy point, and the end piece 260 is fastened tangentially to the tower shaft 32 via the anchoring element 262. FIG. 13b shows a variant in which the guy element 20 is guided around the tower 32 in a looped manner and is fastened to the tower by anchoring elements 262.

Figure 14A:
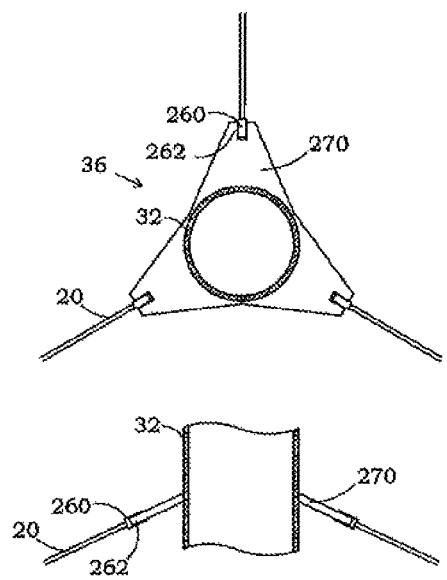
FIG. 14a shows another example of a guy element according to the invention.

FIG. 14a shows by way of example a variant of the guy point 36 in which the guy element 20 is provided with an end piece 260 and is anchored in an element 270 which adjoins the tower 32 in a trapezoidal manner. This permits a force transmission between the guy element 20 and the tower tube 32 as homogeneously as possible.

In FIGS. 11 to 14, the end piece 260 is preferably mounted in a spherical or biaxial manner. This grants that no unilateral loads occur at the abutment and all degrees of liberty of the upper abutment 36 which constitute a flexible torsion spring are ensured.

Figure 14B:
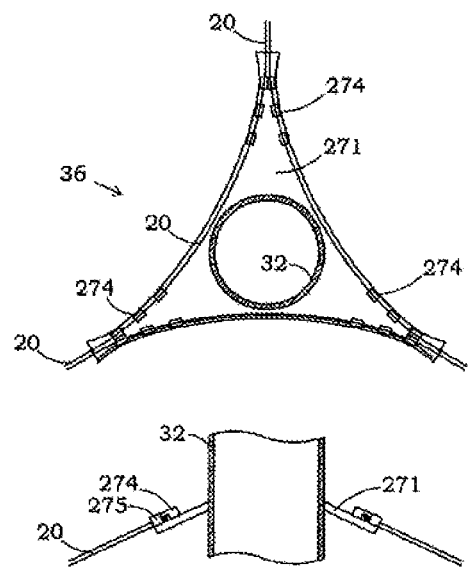
FIG. 14b shows another example of a guy element according to the invention.

FIG. 14b shows, by way of example, a variant of the guy point 36 in which the guy element 20 is guided via a deflection saddle 271 which also connects to the tower tube 32 in a trapezoidal manner. The guy element is secured against a lateral shift and a slipping out via retaining elements 274, and the deflection saddle is widened at its ends in a trumpet-shaped manner to not kink the guy element.

Figure 15A:
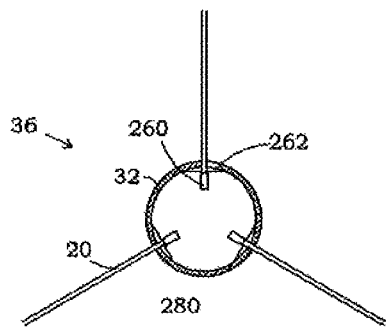
FIG. 15a shows another example of a guy element according to the invention.

FIG. 15a shows, by way of example, a variant of the guy point 36 in which the guy element 20 is guided into the tower shaft 32 and the end piece 260 is fixed there in an interior abutment 262.

Figure 15B:
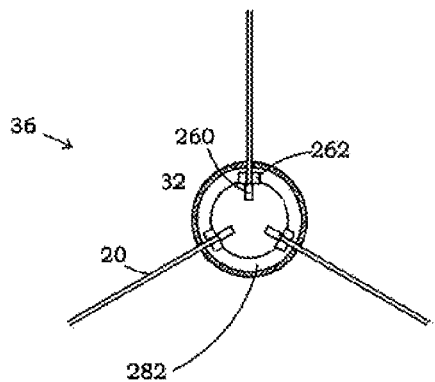
FIG. 15b shows another example of a guy element according to the invention.

FIG. 15b shows a variant of FIG. 15 with a reinforcing element 282 in a top view.

Figure 16:
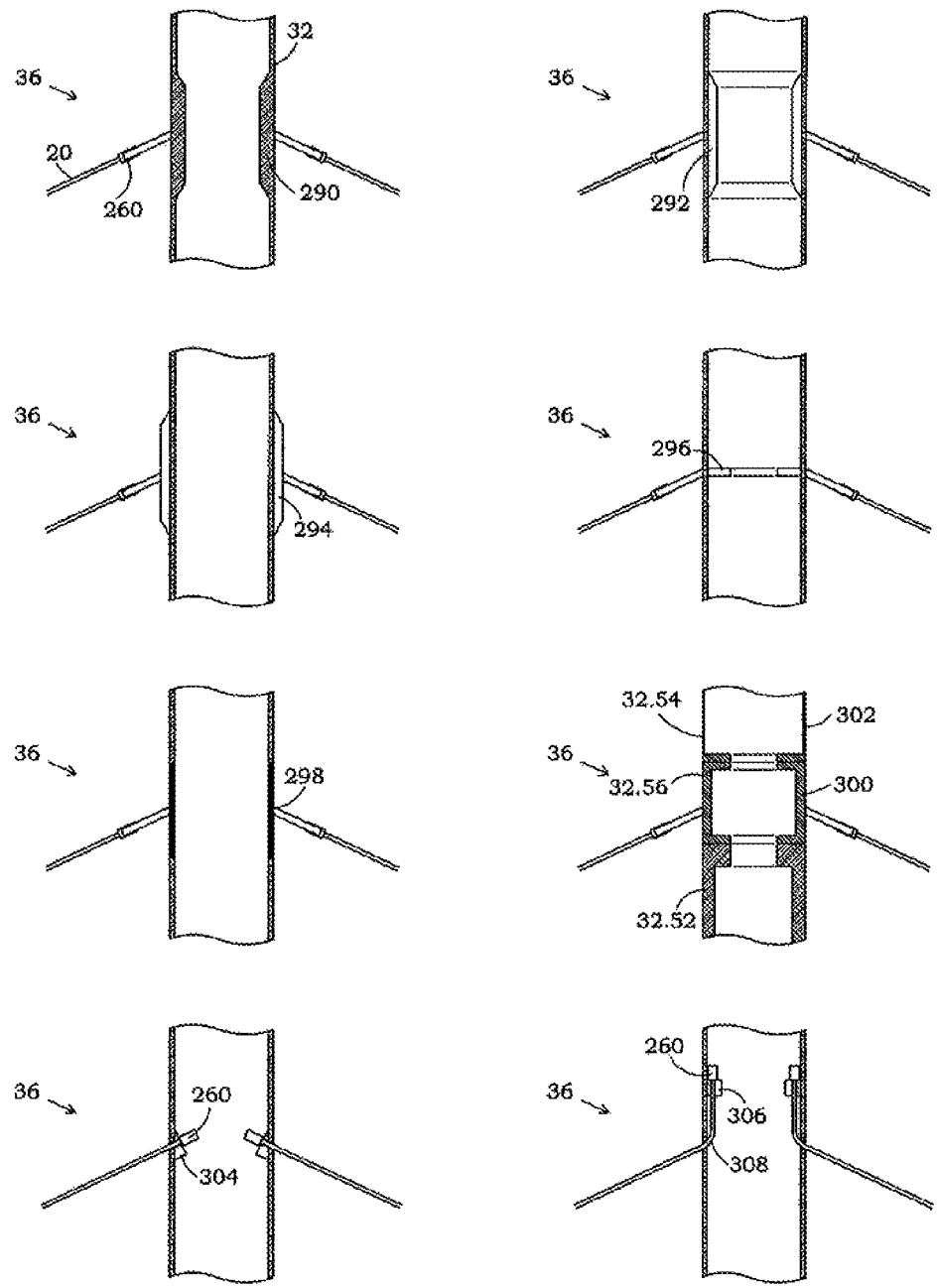
FIG. 16 shows different embodiments to reinforce a guy point according to the guy element design variants of FIGS. 14 and 15.

FIG. 16 shows, by way of example, the guy point 36 and different embodiments to reinforce this point according to the design variants of FIGS. 14 and 15. The forces of the transition element 270 that apply there and pass therethrough, are received and guided in a secure, permanent, and an appropriate manner for the materials involved. The sectional views show in sequence a shaft wall reinforcement 290 inwards made of the material of the shaft wall. 292 shows a separate reinforcement on the inside, 294 shows a separate reinforcement on the exterior side, and 296 shows a ring-shaped reinforcement on the inside. A variant with a strengthened reinforcement is shown at 298 in the shaft cross-section (the same applies to higher concrete property classes), and also shown is a variant having a transition piece 32.56 which also has a reinforced wall 300. The last line shows variants with interior abutments 304 and 306 in which the guy element is anchored directly. In the abutment 304 it is fixed along with the end element 260 and in the abutment 306 it is fixed via a deflection 308.

According to the invention, combinations of all building principles represented here, and also corresponding construction methods, are possible.

Figure 17:
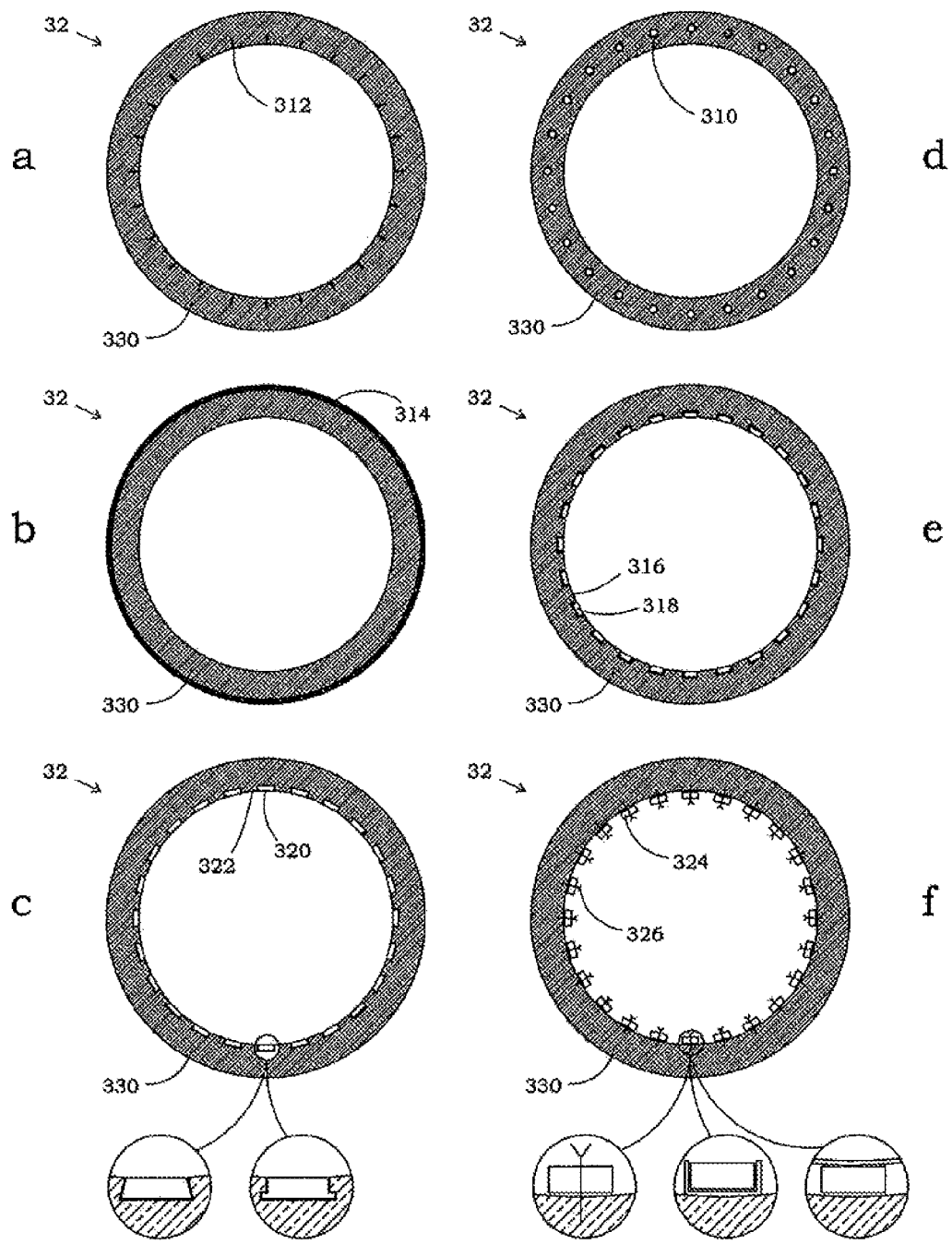
FIG. 17a shows a section view of one example of a prestressed concrete shaft.
FIG. 17b shows a section view of another example of a prestressed concrete shaft.
FIG. 17c shows a section view of another example of a prestressed concrete shaft.
FIG. 17d shows a section view of another example of a prestressed concrete shaft.
FIG. 17e shows a section view of another example of a prestressed concrete shaft.
FIG. 17f shows a section view of another example of a prestressed concrete shaft.

FIG. 17a-f shows, by way of example, embodiments of the prestressed concrete shaft 32. FIG. 17a shows an embodiment composed of a steel concrete cross-section 330 and of carbon fiber lamellas 312 which are bonded in slots provided therefor. FIG. 17b shows an embodiment in which the tower tube is enclosed outside by a coating 314 or a permanent formwork or a sandwich element which can receive prestressing forces. This may also be, among others, textile reinforced fine concrete layers. FIG. 17c shows an externally unbonded embodiment in which the tension members 320 are embedded in the tower wall and are prevented by their geometry from projecting from the niches. FIG. 17d shows a variant in which the tension elements 310 are guided in an internally unbonded manner FIG. 17e shows a variant in which the tension elements 318 are held in their position in an externally unbonded manner by guiding geometries 316. FIG. 17f shows a variant in which the tension members 324 are guided in an externally unbonded manner along the smooth tower inner side using fastening elements 326.

According to the invention, all embodiments shown here can be combined with each other at will and be modified within the meaning of the invention.

FIGS. 18 to 21 show the tower base element 60 according to the invention in different exemplary embodiments.

FIG. 18a shows, by way of example, a variant in section in which the internally unbonded tension members 68 are anchored in a tensioning duct 65 at the lower end of the prestressed concrete shaft 64. Therefore a recess 70 is provided in the base element 60 for the pulling heads 76 of the tension members. The usual so called "tension-cellar" or "tensioning-cellar" in the foundation 26 according to the prior art is advantageously no longer necessary. The recess in the tower wall holds the required space for mounting purposes, here in particular for the tensioning device 78, available. Openings and access elements such as doors 72 or empty tubes 74 for cable routes and similar are integrated in the base element. The base element is preferably a prefabricated part which includes several functions and functionalities at the tower base as a link between the concrete shaft 64 and the foundation 26.

FIG. 18b shows, by way of example, a variant to FIG. 18a in which the internally unbonded tension members experience a deviation 80 before anchoring.

FIG. 18c shows, by way of example, a variant in which the tension members 82 run in an externally unbonded manner along the tower inner wall 86 and the abutment 84 projects inwards.

FIG. 19a shows an exemplary variant in which the tension member abutment 85 is connected to the tower shaft 86 by retaining elements 85.1. In the illustrated variant, the tower shaft extends up to the foundation 26 without any further additional tower base elements, like in the prior art.

FIG. 19b shows, by way of example, a variant in which the tension member 82 is guided through the shaft wall via a deviation 94 to the outside. The abutment being formed there is equipped with a weather protection 92. The interior of the tower in this variant advantageously remains free of any space required for prestressing works.

FIG. 19c shows, by way of example, the same embodiment for tension members 68 in a tensioning duct 65.

FIG. 20a shows, by way of example, a butt joint 110 at the transition between the tower base element 60 and the prestressed concrete shaft 100.

FIG. 20b shows, by way of example, an embodiment in which a further component layer 108, preferably a coating, for example a textile concrete layer is applied to the exterior side.

FIG. 20c shows, by way of example, an embodiment in which the tower shaft 100 emerges inside from the base element 60. FIG. 21a shows the same from the outside.

FIG. 21b shows, by way of example, an embodiment variant in which the tower shaft is butt-jointed or directly placed onto the foundation.

FIG. 21c shows, by way of example, a variant in which the planes of the access opening 72, the subsoil 1, grounds and cavities are arranged differently with respect to each other, as far as necessary.

According to the invention, all designs of FIGS. 19 to 21 can be combined and mixed with each other at will and can be modified within the meaning of the invention.

FIG. 22a-d shows, in several variants, inner wall developments 200 and different exemplary positioning and arrangements of the tension members 205 in accordance with the size of the occurring bending moment 214 in the tower shaft.

According to FIG. 22a, all tension members may extend, according to the invention, from the tip of the tower and the upper anchoring 202, preferably in the transition piece 61 below the nacelle, up to the base of the tower. The tension members may be fixed to the lower end of the tower by anchorings 206, preferably to a base element 208 according to the invention. In case bonded tension members or tension members that are embedded in concrete are used over the entire length (in particular in case of carbon fiber lamellas), the pulling heads and their abutments are unnecessary since the tensioning force is released to the surrounding component over the entire length of the bonding.

In accordance with FIG. 22b, a certain number of tension members may also not extend over the entire shaft length but end at intermediate planes 210. This arrangement results from the fact that the maximum of the moment force 220 occurs at the height of the guy anchoring point 204 and decreases to values close to zero 218, 216 towards the spire and the tower base.

According to FIG. 22c, a certain number of tension members 212 can be arranged in particular merely above the upper guy plane since the shaft cross-section is additionally acted upon with prestress by the guy below the upper (or sole) guy anchoring point 204.

FIG. 22d shows a variant in which the tension members extend up to below the access opening 207 at the lower end of the tower. Openings 209, in particular for maintenance purposes, may also be provided at different heights of the tower. According to the invention, these maintenance hatches may be positioned in regions in which no tension members extend along the shaft wall.

FIG. 23a-c describes in the variants 23a to 23c in the same manner the possible arrangement of the tension members 205 for a tower shaft 200 which in the example shown is made of prestressed concrete merely up to the guy anchoring point 204, onto which a transition piece 61.1 is preferably placed, further tension resistant shaft elements 242 having thin and light wall cross-sections being placed thereon. Also in this case, tension members 205 may end prematurely at different heights 210, 211, 212 in accordance with the decreasing moment 214 in the tower shaft towards the lower end 218. This saves material and costs.

Figure 24:
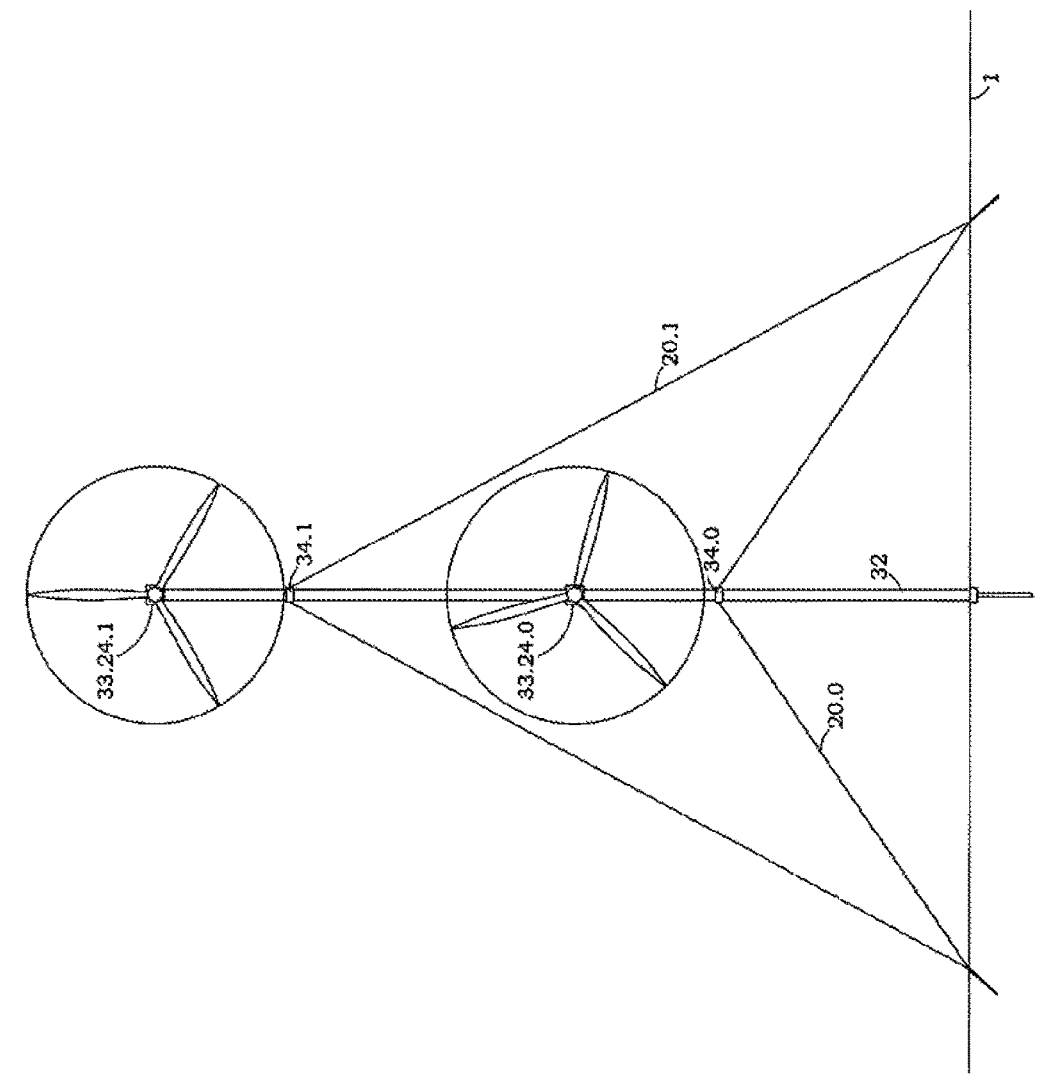
FIG. 24 shows one example of a plurality of wind generators.

FIG. 24 shows, by way of example, a possible arrangement of several wind generators 33.24.0 and 33.24.1 one on top of each other at the tower shaft 32 according to the invention with a lower guy 20.0 at guy points below the lower rotor 34.0 and a guy 20.1 arranged therebetween at guy points 34.1 located between the generators. This arrangement of guy elements does not only introduce the tensioning force into the tower. It also receives the moment force of the tower shaft and thus permits stacked WPPs. This is possible as the interaction of a poor moment and a torsional rigidity in the tower shaft cross-section also allows layouts having a double or multiple load for large wind generators. The generators preferably range in the multi-megawatt class as from 2MW installed capacity. In this way, in comparison with conventional plants, it is possible to achieve nearly double yields at one single site. In a two-story farm layout, the required area is furthermore reduced by half or the yield thereof doubled.

Figure 25:
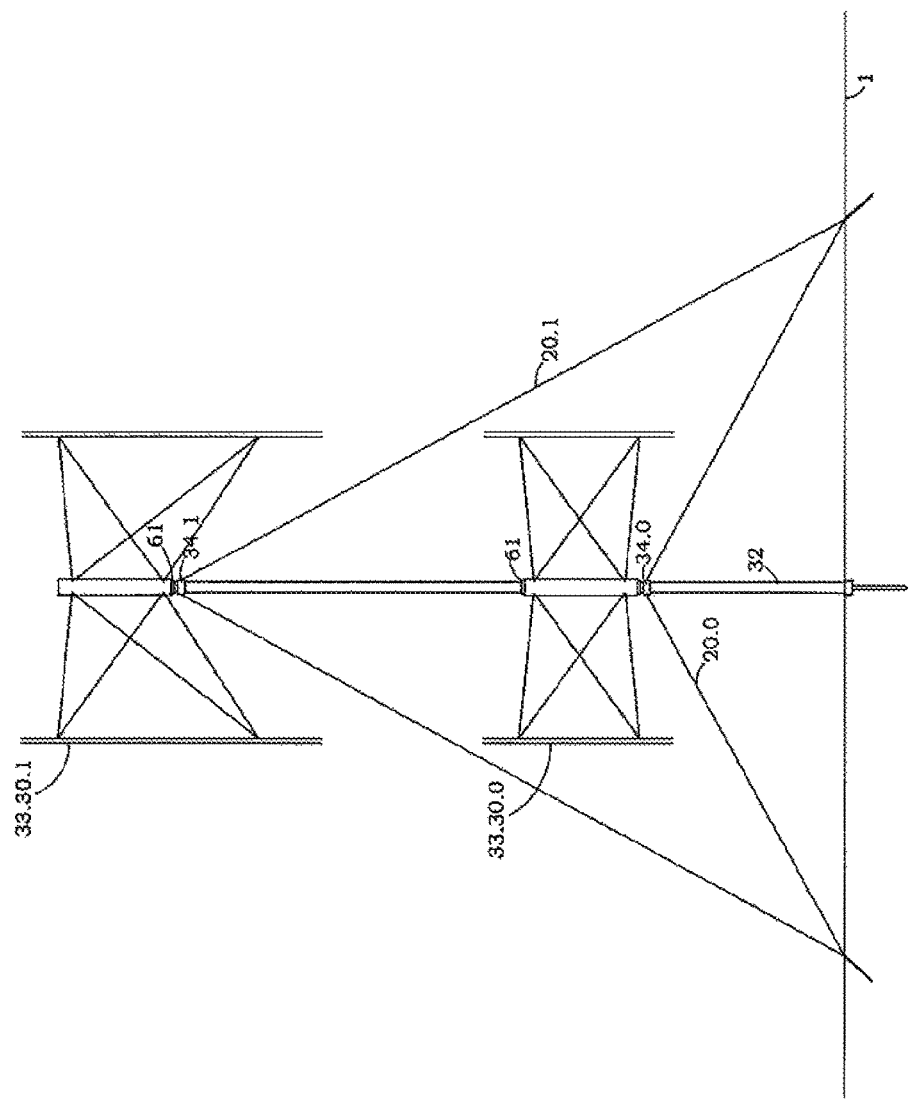
FIG. 25 shows another example of a plurality of wind generators.

FIG. 25 shows, by way of example, a possible arrangement of a plurality of wind generators 33.30.0 and 33.30.1 having a vertical axis one on top of each other. They are placed on the tower shaft 32 according to the invention with a lower guy 20.0 at guy points below the lower rotor 34.0 and another guy 20.1 arranged therebetween at guy points 34.1 located between the generators. This arrangement of guy elements—which in addition to the introduction of the prestress force into the tower also receive the moment force of the tower shaft—permits stacked WPPs also for the vertical embodiment of WPP generators for the reasons mentioned in the preceding paragraph.

Figure 26:
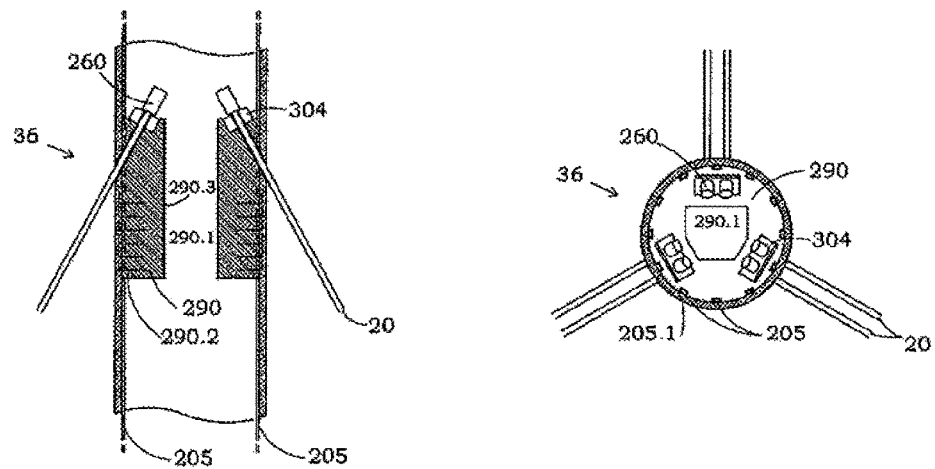
FIG. 26 shows examples of connecting constructions for the guy element.
Figure 27:
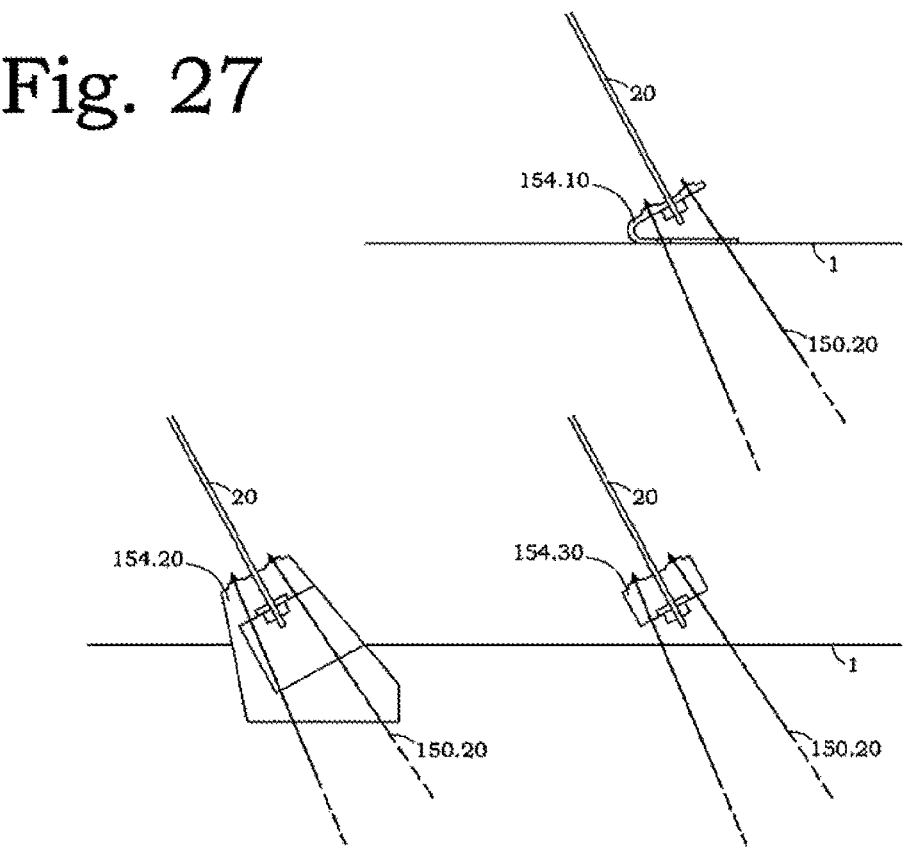
FIG. 27 shows other examples of connecting constructions for the guy element.

FIGS. 26 and 27 show preferred connecting constructions for the guy element as a combination of the features described above. FIG. 26 shows a shaft spreading directed to the inside. A concrete element 290 having an abutment 304 for a double-guided and therefore redundantly guided guy element 20 is preferably built on a previously built tower wall in a permanent formwork 290.3 by reverse bending anchoring 290.2. Vertical tension member elements 205 are here guided in recesses 205.1.

FIG. 27 shows in three different embodiments the abutment component 154 which is fastened in the subsoil by permanent soil anchors 150.20, by way of example. In the variant 154.10, the introduced tensile stress of the guy element 20 is transmitted to the subsoil anchoring via a desk-like element. In the variant 154.20, the tensile stress of the guy element 20 is transmitted to an abutment component partly sunk in the earth which in turn transmits the introduced force to the surrounding subsoil via a soil anchoring 150.20. Variant 154.30 shows an element which connects the guy element 20 and the subsoil anchoring 150.20 to each other in a floating manner.

According to the invention, all embodiments illustrated in the figures by way of example can be freely combined and mixed with each other and can be modified within the meaning of the invention.

According to the invention, the tower structure is optionally provided with a device for the variable adjustment of the tensile stress of the tension members and/or of the guy elements.

FIG. 28 refers again to aerodynamic damping. According to the invention, an actuator 166 (like shown in FIG. 8), shortens or slackens for example near the fixing points the length of the tension members and/or of the guy elements. The variation in length is symbolized by the icons 504 and 506. This influences on the one hand, the natural frequency of the guy element and of the tower shaft and, on the other hand, permits an aerodynamic damping of the entire tower structure in the form of a swivel motion by a controlled yielding (FIG. 28*b*). This actuators changing the length, symbolized by the icons 504, 506, are connected to a logic unit 164 (not shown in this Figure). The logic unit preferably processes values such as the oscillation of the guy element, the tensile stress of tension members and/or guy element, the speed of the rotor unit, the blade oscillation plus the oscillation of the tower shaft. The logic unit calculates a required tensile stress in the tension members and/or guy elements or other quantities therefrom. The actuator, controlled by the logic unit then leads to a desired change in length that leads to the controlled yielding in case of impacting gusts of wind, called aerodynamic damping.

According to the invention, the logic unit sets the calculated required tensile stress in the tension members and/or the guy elements such that excitation frequencies and natural frequencies remain separated from each other by a change in the tensile stress in the guy element and in the tower shaft. The design of the tower natural frequency with respect to the excitation frequencies p and 3p according to the Campbell diagram may be chosen such that the tower can alternate between hard/hard, hard/soft, resonance/soft and soft/soft by a change of the tensioning force. If necessary, the logic unit data is additionally adapted for monitoring purposes and monitoring long-term behavior.

According to the invention, this change in the tensile stress of the guy elements can also be realized by lateral tightening of the guy element by a further element, preferably a second retaining element which is connected to an actuator. The oscillations and the harmonics in particular of the guy elements are thus efficiently dampened in terms of their possible (wind-induced) oscillations.

According to the invention, the adjustable tensile force of the prestress and/or guy members can be employed such that the entire construction has a softer behavior over a certain extent of deflection from the starting position than in case of deflections therebeyond. An aerodynamic damping similar to a swinging bar directed upwards by yielding is thus possible beyond a specific range to make better use of the wind power as a result of the aerodynamic damping by a short-term yielding and swinging back (FIG. 28*b*) than in case of a rigid construction. In case of deflections going therebeyond, the prestress force and/or the guy force is adjusted or limited such that a further deformation is impossible and may for example prevent a concrete tubular construction from transiting from state I to state II. It also may prevent the construction or parts thereof from being deflected or deformed beyond a desired degree to avoid an excessive tilting of the turbine (FIG. 28*c*).

FIG. 28*d* shows a sectional view through the tower shaft with exemplary tension member elements 82 the length of which is variably adjustable by symbolized actuators 506. The tension member elements 82 may appropriately also be mounted at the upper end of the tower shaft.

According to the invention, in particular the yielding of the guying by actuators is to be mentioned as advantageous, which confers the properties of a yielding pendulum over the entire length of 500 to the vertical bar and thus avoids a pitching of the nacelle. This counts in particular due to the second modular shape of the tower and thus reduces Coriolis forces 508 caused by the rotation of the rotating mass of the rotor 510 over a short distance 502 up to the guy point 512. This is schematically described in the comparison of FIGS. 28*b* and 28*c*. The same applies by analogy to rotors having a vertical axis.

According to the invention, the actuators at the tension members and/or the guy elements to adjust the tensile stress can be of an active type.

According to the invention, the tower structure has at its lower fixing point a permanently elastic connection between the tower and the foundation which avoids restraints due to imperfections, inclined positions, different settlements of the ground and a tilting of the foundation caused thereby or by deformation under stress in the modular shapes of the tower shaft. This prevents a crack formation at the transition between the tower and the foundation. This connection is not rotatable about the longitudinal axis of the tower.

Against the prejudice of professional experts, further advantages are produced for the class of multi-megawatt WPP which a guyed mast additionally involves: here, in particular material saving and material efficiency by a large slenderness are to be mentioned. The lateral deflection of the wind generator is considerably lower, and the desired considerably higher hub heights are obtained at a justifiable constructive expenditure due to the torsional rigidity. Due to the optional actuators in the prestressing and guy elements, possible resonances can be actively avoided. Lateral deflections can be adjusted such that an aerodynamic absorption remains possible despite the high rigidity of the construction. The land consumption of the entire plant is smaller due to the slender tower base, and due to the extreme slenderness, the landscape is less deteriorated than by conventional building methods.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A tower structure for a wind power plant comprising:
a tower shaft defining a longitudinal axis;
a foundation and a transition piece in a region of an upper end of the tower shaft;
guy elements inclined towards the longitudinal axis of the tower shaft, the guy elements extending radially outside an outer skin defined by the tower shaft, and wherein the tower shaft is guyed at least in sections by the guy elements, and wherein at least one guy element is coupled to a device for variable adjustment of a tensile stress of the at least one guy element;
tension members radially inside the outer skin wherein the tower shaft is prestressed vertically at least in sections by the tension members, and wherein the tower shaft is made of prestressed concrete in a region between the transition piece and the foundation; and
an actuator that causes a change in length of the at least one guy element at a lower fixing point and/or at an upper fixing point of the at least one guy element to change the tensile stress in the at least one guy element and to change a stress in a guyed region of the tower shaft.

2. The tower structure according to claim 1, wherein cooperation of tensioning forces composed of prestress and guying jointly results in a force for prestressing the tower shaft.

3. A tower structure for a wind power plant comprising:
a tower shaft defining a longitudinal axis;
a foundation and a transition piece in a region of an upper end of the tower shaft;
guy elements inclined towards the longitudinal axis of the tower shaft, the guy elements extending radially outside an outer skin defined by the tower shaft, and wherein the tower shaft is guyed at least in sections by the guy elements;
tension members radially inside the outer skin wherein the tower shaft is prestressed vertically at least in sections by the tension members, and wherein the tower shaft is made of prestressed concrete in a region between the transition piece and the foundation, and wherein a tensioning force in the tension members of the tower structure are configured to be adjustable in a variable manner; and
actuators that are adapted to set a tensile stress in provided tension member elements such that over a determined range of deformation, the tower structure behaves in a softer manner in terms of bending and torsion to not exceed the determined range of deformation.

4. The tower structure according to claim 1, including tendons that generate a variable tensioning force in the at least one guy element.

5. The tower structure according to claim 1, including sensors to determine current data on a status of the tower structure during operation of the wind power plant, and in that a tensile stress in the at least one guy element is actively modified depending on the current data.

6. The tower structure according to claim 1, wherein the actuator is coupled to a logic unit and is piloted thereby, and wherein the logic unit monitors a tensioning force of an associated prestressing element, or of a plurality of prestressing elements, a rotor speed, a tower oscillation and/or oscillation of the associated element(s).

7. The tower structure according to claim 1, wherein sensors are present for determination of values comprising
an oscillation of one or more guy elements,
the tensile stress of the guy element,
a speed of a rotor unit, blade oscillation,
wind velocity of wind flowing in front of the tower structure, and/or
oscillation of the tower structure, and wherein the values are processed and a necessary tensile stress is determined based on the values.

8. The tower structure according to claim 1, including at least one anchoring element and wherein the actuator sets a calculated required tensile stress in the guy element via the anchoring element.

9. The tower structure according to claim 3, wherein the tower shaft has a cross-section enclosing a cavity.

10. A tower structure for a wind power plant comprising:
a tower shaft defining a longitudinal axis;
a foundation and a transition piece in a region of an upper end of the tower shaft;
guy elements inclined towards the longitudinal axis of the tower shaft, the guy elements extending radially outside an outer skin defined by the tower shaft, and wherein the tower shaft is guyed at least in sections by the guy elements; and
tension members radially inside the outer skin wherein the tower shaft is prestressed vertically at least in sections by the tension members, and wherein the tower shaft is made prestressed concrete in a region between the transition piece and the foundation, and wherein different types of concrete, different shaft cross-sections, and different reinforcement degrees are used to avoid harmonic resonances of the tower structure.

11. The tower structure according to claim 10, wherein a plurality of wind generators is arranged on the tower shaft.

12. The tower structure according to claim 10, wherein the tower shaft has an outer skin comprising textile-reinforced fine concrete or permanent formwork elements.

13. The tower structure according to claim 10, wherein the tower shaft has a constant outer cross-section to form a cylindrical outer skin, and wherein an inner diameter of the tower shaft has a non-constant inner cross-section.

14. The tower structure according to claim 10, wherein the tower structure has several guy anchoring heights, the guy elements of which converge in common foundations at a bottom.

15. The tower structure according to claim 10, wherein in a region of guying, the tower shaft has reinforcements comprising one-piece cross-sectional widened portions.

* * * * *